US008399724B2

(12) United States Patent
Crowther et al.

(10) Patent No.: US 8,399,724 B2
(45) Date of Patent: Mar. 19, 2013

(54) VINYL TERMINATED HIGHER OLEFIN COPOLYMERS AND METHODS TO PRODUCE THEREOF

(75) Inventors: Donna J. Crowther, Seabrook, TX (US); Matthew W. Holtcamp, Huffman, TX (US); John R. Hagadorn, Houston, TX (US); Charles J. Ruff, Houston, TX (US); George Rodriguez, Houston, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 20 days.

(21) Appl. No.: 13/072,249

(22) Filed: Mar. 25, 2011

(65) Prior Publication Data
US 2012/0245310 A1 Sep. 27, 2012

(51) Int. Cl.
C08F 210/06 (2006.01)
C08F 210/14 (2006.01)
C08F 4/6592 (2006.01)
C10M 107/06 (2006.01)

(52) U.S. Cl. .................. 585/10; 585/520; 585/523

(58) Field of Classification Search .................. 585/10, 585/520, 523
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A | 8/1995 | Tomita et al. | |
| 5,498,809 A | 3/1996 | Emert et al. | |
| 5,504,172 A | 4/1996 | Imuta et al. | |
| 5,616,153 A | 4/1997 | Mike et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 5,811,379 A | 9/1998 | Rossi et al. | |
| 5,859,159 A | 1/1999 | Rossi et al. | |
| 5,936,041 A | 8/1999 | Diana et al. | |
| 6,017,859 A | 1/2000 | Rossi et al. | |
| 6,111,027 A | 8/2000 | Wright et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |
| 6,255,426 B1 | 7/2001 | Lue et al. | |
| 6,268,518 B1 | 7/2001 | Resconi et al. | |
| 6,410,666 B1 | 6/2002 | Grubbs et al. | |
| 6,444,773 B1 | 9/2002 | Markel | |
| 6,448,350 B1 | 9/2002 | Dall'Occo et al. | |
| 6,476,167 B2 | 11/2002 | Peters | |
| 6,525,157 B2 | 2/2003 | Cozewith et al. | |
| 6,703,457 B2 | 3/2004 | van Baar et al. | |
| 6,750,307 B2 | 6/2004 | Weng et al. | |
| 6,897,261 B1 | 5/2005 | Machida et al. | |
| 6,939,930 B2 | 9/2005 | Reinking et al. | |
| 7,126,031 B2 | 10/2006 | Boussie et al. | |
| 7,247,385 B1 | 7/2007 | Tzoganakis et al. | |
| 7,276,567 B2 | 10/2007 | Voskoboynikov et al. | |
| 7,294,681 B2 | 11/2007 | Jiang et al. | |
| 7,524,910 B2 | 4/2009 | Jiang et al. | |
| 7,541,413 B2 | 6/2009 | Crowther et al. | |
| 7,589,160 B2 | 9/2009 | Resconi et al. | |
| 7,683,359 B2 | 3/2010 | Green | |

(Continued)

FOREIGN PATENT DOCUMENTS

| | | |
|---|---|---|
| CN | 101011062 | 8/2007 |
| EP | 0 767 182 | 4/1997 |

(Continued)

OTHER PUBLICATIONS

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.
Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.
Babu et al., "*Microstructure of Poly(1-hexene) Produced by ansa-Zirconocenium Catalysis*", Macromolecules, 1994, vol. 27, pp. 3383-3388.
Baldwin et al., "*Cationic Alkylaluminum-Complexed Zirconocene Hydrides as Participants in Olefin Polymerization Catalysis*", JACS, 2010, vol. 132, pp. 13969-13971.
Bhriain et al., "*Polymeryl-Exchange Between Ansa-Zirconocene Catalysts for Norbornene-Ethene Copolymerization and Aluminum or Zinc Alkyls*", Macromolecules, 2005, vol. 38, pp. 2056-2063.

(Continued)

*Primary Examiner* — Caixia Lu

(57) ABSTRACT

This invention relates to a vinyl terminated higher olefin copolymer having an Mn of 300 g/mol or more (measured by $^1$H NMR) comprising: (i) from about 20 to about 99.9 mol % of at least one $C_5$ to $C_{40}$ higher olefin monomer; and (ii) from about 0.1 to about 80 mol % of propylene; wherein the higher olefin copolymer has at least 40% allyl chain ends. The copolymer may also have an isobutyl chain end to allyl chain end ratio of less than 0.7:1 and/or an allyl chain end to vinylidene chain end ratio of greater than 2:1.

11 Claims, 1 Drawing Sheet

U.S. PATENT DOCUMENTS

| | | | |
|---|---|---|---|
| 7,790,810 B2 | 9/2010 | Coates et al. | |
| 7,820,607 B2 * | 10/2010 | Matsuda et al. | 508/591 |
| 7,897,679 B2 | 3/2011 | Stevens et al. | |
| 7,943,716 B2 | 5/2011 | Resconi et al. | |
| 7,960,487 B2 | 6/2011 | Yang et al. | |
| 8,058,351 B2 | 11/2011 | Pawlow et al. | |
| 2002/0137978 A1 | 9/2002 | Grubbs et al. | |
| 2003/0161752 A1 | 8/2003 | Luk et al. | |
| 2004/0054086 A1 | 3/2004 | Schauder et al. | |
| 2004/0127649 A1 | 7/2004 | Arjunan | |
| 2004/0214953 A1 | 10/2004 | Yamada et al. | |
| 2004/0249046 A1 | 12/2004 | Abhari et al. | |
| 2005/0054793 A1 | 3/2005 | Reinking et al. | |
| 2005/0159299 A1 | 7/2005 | Rodriguez et al. | |
| 2005/0261440 A1 | 11/2005 | Dickakian et al. | |
| 2006/0052553 A1 | 3/2006 | Resconi et al. | |
| 2006/0270814 A1 | 11/2006 | Mako et al. | |
| 2007/0293640 A1 | 12/2007 | Jiang et al. | |
| 2008/0228017 A1 | 9/2008 | Burdett et al. | |
| 2008/0234451 A1 | 9/2008 | Kenwright et al. | |
| 2009/0198089 A1 | 8/2009 | Burton et al. | |
| 2009/0221750 A1 | 9/2009 | Tsunogae et al. | |
| 2009/0247441 A1 | 10/2009 | Baum | |
| 2009/0318640 A1 | 12/2009 | Brant et al. | |
| 2009/0318644 A1 | 12/2009 | Brant et al. | |
| 2009/0318646 A1 | 12/2009 | Brant et al. | |
| 2009/0318647 A1 | 12/2009 | Hagadorn et al. | |
| 2010/0069573 A1 | 3/2010 | Arriola et al. | |
| 2010/0152388 A1 | 6/2010 | Jiang et al. | |
| 2010/0170829 A1 | 7/2010 | Ng et al. | |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 1993/320260 | 3/1993 |
| JP | 2000/038420 | 2/2000 |
| JP | 2005/139284 | 6/2005 |
| JP | 2005-336092 | 12/2005 |
| JP | 2007/169340 | 7/2007 |
| JP | 2007/246433 | 9/2007 |
| JP | 2008/050278 | 3/2008 |
| JP | 2009-299046 | 12/2009 |
| JP | 2010/037555 | 2/2010 |
| JP | 2010-202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp^*)(C2B9H_{11})M(R)$ $(M=Hf, Zr)$", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp^{*2}Mme(THT)]^+[BPh_4]^-$, $M=Ti$, Zr and Hf", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging",Chem. Mater., 2010, vol. 22, pp. 2764-2769.

Harney et al., "End-Group-Confined Chain Walking Within a Group 4 Living Polyolefin and Well-Defined Cationic Zirconium Alkyl Complexes for Modeling This Behavior", JACS, 2004, vol. 126, pp. 4536-4537.

Herzon et al., "Direct, Catalytic Hydroaminoalkylation of Unactivated Olefins with N-Alkyl Arylamines", JACS, 2007, vol. 129, pp. 6690-6691.

Herzon et al., "Hydroaminoalkylation of Unactivated Olefins with Dialkylamines", JACS, 2007, vol. 130, pp. 14940-14941.

Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.

Janiak et al., "Metallocene Catalysts for Olefin Oligomerization", Macromol. Symp., 2006, vol. 236, pp. 14-22.

Janiak et al., "Metallocene and Related Catalysts for Olefin, Alkyne and Silane Dimerization and Oligomerization", Coordination Chemistry Reviews, 2006, vol. 250, pp. 66-94.

Jiang et al., "Highly Z-Selective Metathesis Homocoupling of Terminal Olefins", JACS, 2009, vol. 131, pp. 16630-16631.

Jones et al., "Synthesis and Reactive Blending of Amine and Anhydride End-Functional Polyolefins", Polymer, 2004, vol. 45, pp. 4189-4201.

Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.

Kesti et al., "Group 4 Metallocene Olefin Hydrosilyation Catalysts", Organometallics, 1992, vol. 11, pp. 1095-1103.

Kissin et al., "Post-Oligomerization of a-Olefin Oligomers: A Route to Single-Component and Multipcomponent Synthetic Lubricating Oils", Journal of Applied Polymer Science, 2009, vol. 111, pp. 273-280.
Kobayashi, "*Routes to Functionalized Polyolefins*", The Dow Chemical Company.
Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.
Kolodka et al., "*Synthesis and Characterization of Long-Chain-Branched Polyolefins with Metallocene Catalysts: Copolymerization of Ethylene with Poly(Ethylene-Co-Propylene) Macromonomer*", Macromol. Rapid Commun., 2003, vol. 24, pp. 311-315.
Koo et al., "*Efficient New Routes to Functionalized Polyolefins*", ChemTech. 1999, pp. 13-19.
Kostalik et al., "*Solvent Processable Tetraalkylammonium-Functionalized Polyethylene for Use as an Alkaline Anion Exchange Membrane*", Macromolecules, 2010, vol. 43, pp. 7147-7150.
Kubiak et al., "*Titanium-Catalyzed Hydroaminoalkylation of Alkenes by C—H Bond Activation at SP3 Centers in the Alpha-Position to a Nitrogen Atom*", Angewandte Chemie International Edition, 2009, vol. 48, No. 6, pp. 1153-1156.
Langston et al., "*One-Pot Synthesis of Long Chain Branch PP(LCBPP) Using Ziegler-Natta Catalyst and Branching Reagents*", Macromol. Symp., 2007, vol. 260, pp. 34-41.
Lehmus et al., "*Chain End Isomerization as a Side Reaction in Metallocene-Catalyzed Ethylene and Propylene Polymerizations*", Macromolecules, 2000, vol. 33, pp. 8534-8540.
Lopez et al., "*Synthesis of Well-Defined Polymer Architectures by Successive Catalytic Olefin Polymerization and Living/Controlled Polymerization Reactions*", Progress in Polymer Science, 2007, vol. 32, pp. 419-454.
Lu et al., "*Reactivity of Common Functional Groups with Urethanes: Models for Reactive Compatibilization of Thermoplastic Polyurethane Blends*", Journal of Polymer Science: Part A: Polymer Chemistry, 2002, vol. 40, pp. 2310-2328.
Markel et al., "*Metallocene-Based-Branch—Block Thermoplastic Elastomers*", Macromolecules, 2000, vol. 33, pp. 8541-8548.
Mathers et al., "Cross Metathesis Functionalization of Polyolefins", Chem. Commun., 2004, pp. 422-423.
Moscardi et al., "*Propene Polymerization with the Isospecific, Highly Regioselective rac-Me$_2$C(3-t-Bu-1-Ind)$_2$ZrCl$_2$/MAO Catalyst. 2. Combined DFT/MM Analysis of Chain Propagation and Chain Release Reactions*", Organometallics, 2001, vol. 20, pp. 1918-1931.
Negishi et al., "*Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diyness[1]*", Tetrahedron Letters, 1986, vol. 27, No. 25, pp. 2829-2832.
Nilsson et al., "*Structural Effects on Thermal Properties and Morphology in XLPE*", European Polymer Journal, 2010, vol. 46, pp. 1759-1769.
Ornealis et al., "*Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction*", JACS, 2008, vol. 130, pp. 1495-1506.
Ornealis et al., "*Efficient Mono- and Bifunctionalization of Polyolefin Dendrimers by Olefin Metathesis*", Angewandte Chemie International Edition, 2005, vol. 44, pp. 7399-7404.
Parks et al., "*Studies on the Mechanism of B(C$_6$F$_5$)$_3$-Catalyzed Hydrosilation of Carbonyl Functions*", J. Org. Chem., 2000, vol. 65, pp. 3090-3098.
Prochnow et al., "*Tetrabenzyltitanium: An Improved Catalyst for the Activation of SP3 C—H Bonds Adjacent to Nitrogen Atoms*", ChemCatChem, 2009, vol. 1, No. 1, pp. 162-172.
Resconi et al., "*Chain Transfer Reactions in Propylene Polymerization with Zirconocene Catalysts*", Topics in Catalysis, 1999, vol. 7, pp. 145-163.
Resconi et al., "*Olefin Polymerization at Bis(pentamethylcyclopentadienyl)zirconium and -hafnium Centers: Chain-Transfer Mechanisms*", JACS, 1992, vol. 114, pp. 1025-1032.

Reznichenko et al., "*Group 5 Metal Binaptholate Complexes for Catalytic Asymmetric Hydroaminoalkylation and Hydroamination/Cyclization*", Organometallics, 2011, vol. 30, pp. 921-924.
Roesky, "*Catalytic Hydroaminoalkylation*", Angewandte Chemie International Edition, 2009, vol. 48, pp. 4892-4894.
Rose et al., "*Poly(Ethylene-Co-Propylene Macromonomer)s: Synthesis and Evidence for Starlike Conformations in Dilute Solution*", Macromolecules, 2008, vol. 41, pp. 559-567.
Rossi et al., "*End Groups in 1-Butene Polymerization Via Methylaluminoxane and Zirconocene Catalyst*", Macromolecules, 1995, vol. 28, pp. 1739-1749.
Rulhoff et al., "*Synthesis and Characterization of Defined Branched Poly(propylene)s with Different Microstructures by Copolymerization of Propylene and Linear Ethylene Oligomers (C$_n$=26-28) with Metallocenes/MAO Catalysts*", Macromolecules, 2006, vol. 16, pp. 1450-1460.
Scherman et al., "*Synthesis and Characterization of Stereoregular Ethylene-Vinyl Alcohol Copolymers Made by Ring-Opening Metathesis Polymerization*", Macromolecules, 2005, vol. 38, pp. 9009-9014.
Seayed et al., "Hydroaminomethylation of Olefins Using a Rhodium Carbene Catalyst", Tetrahedron Letters, 2003, vol. 44, No. 8, pp. 1679-1683.
Segawa et al., "*Catalytic Hydroaminoalkylation of Alkene*", Yuki Gosei Kagaku Kyokaishi, 2009, vol. 67, No. 8, pp. 834-844. (Abstract only).
Shiono et al., "*Additive Effects of Trialkylaluminum on Propene Polymerization with (t-BuNSiMe$_2$Flu)TiMe$_2$-Based Catalysts*", Applied Catalysis A: General, 2000, vol. 200, pp. 145-152.
Shiono et al., "*Copolymerization of Atactic Polypropene Macromonomer with Propene by an Isospecific Metallocene Catalyst*", Macromolecules, 1999, vol. 32, pp. 5723-5727.
Sill et al., "*Bis-Dendritic Polyethylene Prepared by Ring-Opening Metathesis Polymerization in the Presence of Bis-Dendritic Chain Transfer Agents*", Journal of Polymer Science: Part A: Polymer Chemistry, 2005, vol. 43, pp. 5429-5439.
Small et al., "*Polymerization of Propylene by a New Generation of Iron Catalysts: Mechanisms of Chain Initiation, Propagation, and Termination*", Macromolecules, 1999, vol. 32, pp. 2120-2130.
Stadler et al., "*Long-Chain Branches in Syndiotactic Polypropene Induced by Vinyl Chloride*", Macromolecular Chemistry and Physics, 2010, vol. 211, pp. 1472-1481.
Sun et al., "*Effect of Short Chain Branching on the Coil Dimensions of Polyolefins in Dilute Solution*", Macromolecules, 2001, vol. 34, pp. 6812-6820.
Sunderhaus et al., "*Oxidation of Carbon-Silicon Bonds: The Dramatic Advantage of Strained Siletanes*", Organic Letters, 2003, vol. 5, No. 24, pp. 4571-4573.
Switek et al., "*ABA Triblock Copolymers with a Ring-Opening Metathesis Polymerization/Macromolecular Chain-Transfer Agent Approach*", Journal of Polymer Science: Part A: Polymer Chemistry, 2007, vol. 45, pp. 361-373.
Thomas et al., "*Synthesis of Telechelic Polyisoprene via Ring-Opening Metathesis Polymerization in the Presence of Chain Transfer Agent*", Macromolecules, 2010, vol. 43, pp. 3705-3709.
Wei et al., "*Aufbaureaktion Redux: Scalable Production of Precision Hydrocarbons from AlR$_3$ (R=Et or iBu) by Dialkyl Zinc Mediated Ternary Living Coordinative Chain-Transfer Polymerization*", Angewandte Chemie Inernational Edition, 2010, vol. 49, pp. 1768-1772.
Weng et al., "*Long Chain Branched Isotactic Polypropylene*", Macromolecules, 2002, vol. 35, pp. 3838-3843.
Weng et al., "*Synthesis of Vinly-Terminated Isotactic Poly(Propylene)*", Macromol. Rapid Commun., 2000, vol. 21, pp. 1103-1107.
Yang et al., "*Catatonic Metallocene Polymerization Catalysts, Synthesis and Properties of the First Base-Free Zirconocene Hydride*", Angewandte Chemie International Edition Engl., 1992, vol. 31, pp. 1375-1377.
Yin et al., "*Scope and Mechanism of Allylic C—H Amination of Terminal Alkenes by the Palladium/PhL(OPiv)$_2$ Catalyst System: Insights into the Effect of Naphthoquinone*", JACS, 2010, vol. 132, pp. 11978-11987.

Zhang et al., "*Functionalization of Polyolefins Through Catalytic Hydrosilylation and Imidation Reactions*", ANTEC, 2005, pp. 2686-2690.

Balboni et al., *C₂-Symmetric Zirconocenes for High Molecular Weight Amorphous Poly(propylene)*, Macromolecular Chemistry and Physics, 2001, vol. 202, No. 10, pp. 2010-2028.

Brzezinska et al., *Synthesis of ABA Triblock Copolymers via Acyclic Diene Metathesis Polymerization and Living Polymerization of a-Amino Acid-N-Carboxyanhydrides*, Macromolecules, 2001, vol. 34, pp. 4348-4354.

Bujadoux et al., *Use of Bridged and Non-bridged Metallocene Catalysts in High Pressure/High Temperature Ethylene/α-olefin Copolymerization*, Metallocene Polymers, 1995, pp. 377-402.

Busico et al., *¹H NMR Analysis of Chain Unsaturations in Ethene/1-Octene Copolymers Prepared with Metallocene Catalysts at High Temperature*, Macromolecules, 2005, vol. 38, No. 16, pp. 6988-6996.

Koo et al., *Silicon-Modified Ziegler-Natta Polymerization. Catalytic Approaches to Silyl-Capped and Silyl-Linked Polyolefins Using "Single-Site" Cationic Ziegler-Natta Catalysts*, JACS, 1999, vol. 121, pp. 8791-8802.

Passaglia et al., *Grafting of Diethyl Maleate and Maleic Anhydride Onto Styrene-b-(Ethylene-co-1-Butene)-b-Styrene Triblock Copolymer(SEBS)*, Polymer, 2000, vol. 41, pp. 4389-4400.

Quirk et al., *Anionic Synthesis of Secondary Amine Functionalized Polymers by Reaction of Polymeric Organolithiums with N-Benzylidenemethylamine*, Macromolecular Chemistry and Physics, 2002, vol. 203, pp. 1178-1187.

Rybak et al., *Acyclic Diene Metathesis with a Monomer with a Monomer from Renewable Resources: Control of Molecular Weight and One-Step Preparation of Block Copolymers*, ChemSusChem, 2008, vol. 1, pp. 542-547.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2,6- Bis(Imino)Pyridyl Ligands: Synthesis, Structures, and Polymerization Studies, Journal of the American Chemical Society, 1999, vol. 121, No. 38, pp. 8728-8740.

Chen et al., Preparation of Epoxy-modified Polyethylene by Graft Extrusion and its Applications to Polyphenylene Sulfide Alloys as a Compatibilizer, Reactive & Functional Polymers, 2008, vol. 68, No. 9, pp. 1307-1313.

Cossy et al., "Cross-Metathesis reaction. Generation of Highly Functionalized Olefins from Unsaturated Alcohols", Journal of Organometallic Chemistry, 2001, vol. 634, Issue 2, pp. 216-221.

Hansell et al., Additive-Free Clicking for Polymer Functionalization and Coupling by Tetrazine-Norbornene Chemistry, Journal of the American Chemical Society, 2011, vol. 133, No. 35, pp. 13828-13831.

Liu et al., Kinetics of Initiation, Propagation, and Termination for the [rac-(C2H4(1-indenyl)2)ZrMe]{MeB(C6F5)3}-Catalyzed Polymerization of 1-Hexene, Journal of the American Chemical Society, 2001, vol. 123, pp. 11193-11207.

Nagai et al., Novel Well-defined Funcationalized Polyolefins and Polyolefin-polar Polymer Block Copolymers: Formations and Their Features, Poly Preprints, 2008, vol. 49, No. 2, 776-777.

Nakatsuka et al., Creation and Application of New Materials by a Fusion of FI-catalyst Technology and Fine Organic Synthesis Technology, Shokubai, 2010, vol. 52, No. 8, pp. 569-574.

Rodriguez et al., Poly(4-vinylpyridazine). First Synthesis, Characterization and Properties, Polymeric Materials Science and Engineering, Proceedings of the ACS Division of Polymeric Materials Science and Engineering, 1990, vol. 63, pp. 376-382 (Abstract).

Shiono et al., Copolymerization of poly(propylene) macromonomer with ethylene by (tertbutanamide)dimethyl(tetramethylqscyclopentadienyl) silane titanium dichloride/methylaluminoxane catalyst, Macromol. Chem. Phys., 1997, vol. 198, pp. 3229-3237.

Weng et al., Synthesis of Long-Chain Branched Propylene Polymers via Macromonomer Incorporation, Macromol. Rapid Commun , 2001, vol. 22, No. 18, pp. 1488-1492.

Xu et al., Ethylene Copolymerization with 1-Octene Using a 2-Methylbenz[e]indenyl-Based ansa-Monocyclopentadienylamido Complex and Methylaluminoxane Catalyst, Macromolecules, 1998, vol. 31, pp. 4724-4729.

\* cited by examiner

Viscosity of Higher Olefin Vinyl Terminated Polymers As a Function Of Temperature
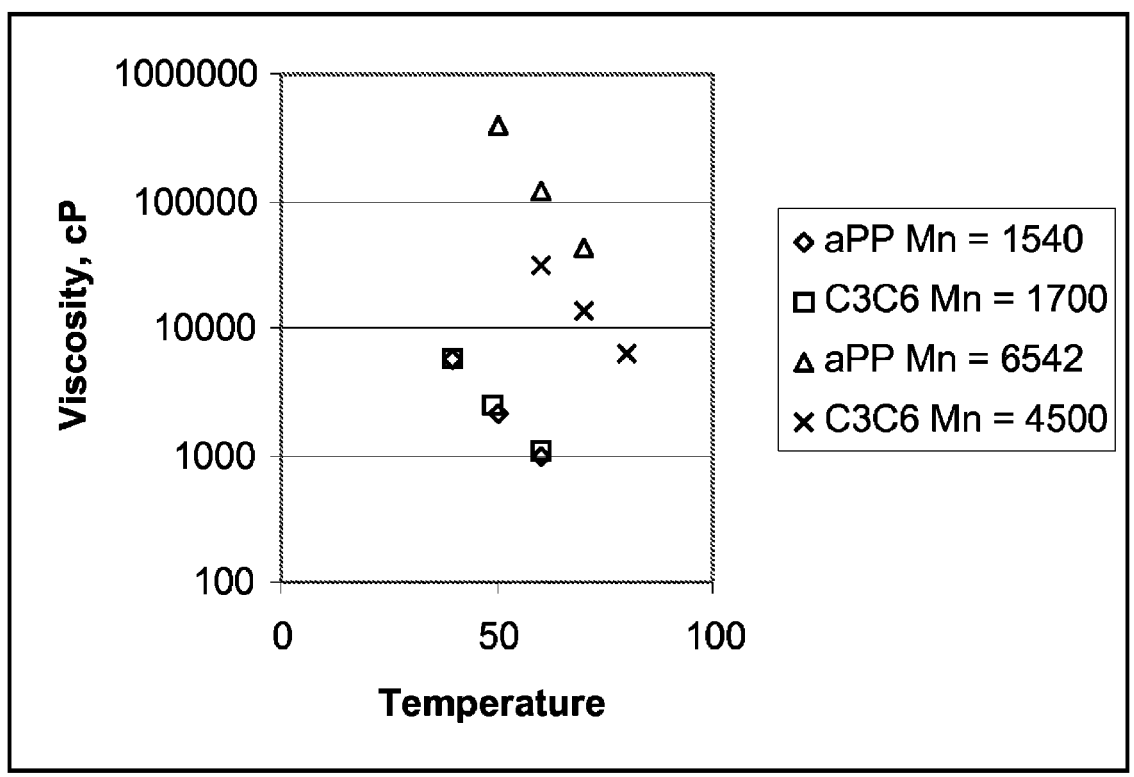

VINYL TERMINATED HIGHER OLEFIN COPOLYMERS AND METHODS TO PRODUCE THEREOF

STATEMENT OF RELATED CASES

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); Ser. No. 12/488,093, filed on Jun. 19, 2009 (Published as WO 2009/155517); and U.S. Ser. No. 12/642,453, filed Dec. 18, 2009; which is a continuation-in-part application of U.S. Ser. No. 12/533,465, filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,280, filed Mar. 25, 2011, entitled "Novel Catalysts and Methods of Use Thereof to Produce Vinyl Terminated Polymers";

b) U.S. Ser. No. 13/072,189, filed Mar. 25, 2011, entitled "Amine Functionalized Polyolefin and Methods for Preparation Thereof";

c) U.S. Ser. No. 13/072,279, filed Mar. 25, 2011, entitled "Enhanced Catalyst Performance for Production of Vinyl Terminated Propylene and Ethylene/Propylene Macromers";

d) U.S. Ser. No. 13/072,383, filed Mar. 25, 2011, entitled "Diblock Copolymers Prepared by Cross Metathesis";

e) U.S. Ser. No. 13/072,261, filed Mar. 25, 2011, entitled "Amphiphilic Block Polymers Prepared by Alkene Metathesis";

f) U.S. Ser. No. 13/072,288, filed Mar. 25, 2011, entitled "Vinyl Terminated Higher Olefin Polymers and Methods to Produce Thereof";

g) U.S. Ser. No. 13/072,305, filed Mar. 25, 2011, entitled "Hydrosilyation of Vinyl T-efminated-Macromers with Metallocenes";

h) U.S. Ser. No. 13/072,432, filed Mar. 25, 2011, entitled "Olefin Triblock Polymers via Ring-Opening Metathesis Polymerization";

i) U.S. Ser. No. 13/072,330, filed Mar. 25, 2011, entitled "Block Copolymers from Silylated Vinyl Terminated Macromers"; and j) U.S. Ser. No. 61/467,681, filed Mar. 25, 2011, entitled "Branched Vinyl Terminated Polymers and Methods for Production Thereof".

FIELD OF THE INVENTION

This invention relates to olefin copolymerization, particularly to produce vinyl terminated copolymers.

BACKGROUND OF THE INVENTION

Alpha-olefins, especially those containing about 6 to about 20 carbon atoms, have been used as intermediates in the manufacture of detergents or other types of commercial products. Such alpha-olefins have also been used as comonomers, especially in linear low density polyethylene. Commercially produced alpha-olefins are typically made by oligomerizing ethylene. Longer chain alpha-olefins, such as vinyl-terminated polyethylenes, are also known and can be useful as building blocks following functionalization or as macromonomers.

Allyl terminated low molecular weight solids and liquids of ethylene or propylene have also been produced, typically for use as branches in polymerization reactions. See, for example, Rulhoff, Sascha and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules, 16, 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mn's and do not have at least 93% allylic vinyl unsaturation. Likewise, these oligomers lack comonomer and are produced at low productivities with a large excess of alumoxane (molar ratio≧600 Al/M; M=Zr, Hf). Additionally, no less than 60 wt % solvent (solvent+propylene basis) is present in all of the examples.

Teuben et al. (J. Mol. Catal., 62, 1990, pp. 277-287) discloses the use of $[Cp*_2MMe(THT)]+[BPh_4]$ (M=Zr and Hf; Cp*=pentamethylcyclopentadienyl; Me=methyl, Ph=phenyl; THT=tetrahydrothiophene), to make propylene oligomers. For M=Zr, a broad product distribution with oligomers up to $C_{24}$ (number average molecular weight (Mn) of 336) was obtained at room temperature. Whereas, for M=Hf, only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang et al. (Angew. Chem. Intl. Ed. Engl., 31, 1992, pg. 1375) discloses amorphous, low molecular weight polypropylene made at low temperatures where the reactions showed low activity and product having 90% allylic vinyls, relative to all unsaturations, by $^1$H NMR. Thereafter, Resconi et al. (J. Am. Chem. Soc., 114, 1992, pp. 1025-1032), discloses the use of bis(pentamethylcyclopentadienyl)zirconium and bis(pentamethylcyclopentadienyl)hafnium to polymerize propylene and obtained beta-methyl termination resulting in oligomers and low molecular weight polymers with "mainly allyl- and iso-butyl-terminated" chains. As is the case in U.S. Pat. No. 4,814,540, the oligomers produced do not have at least 93% allyl chain ends, an Mn of about 500 to about 20,000 g/mol (as measured by $^1$H NMR), and the catalyst has low productivity (1-12,620 g/mmol metallocene/hr; >3000 wppm Al in products).

Similarly, Small and Brookhart, (Macromolecules, 32, 1999, pg. 2322) disclose the use of a pyridylbisamido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm. 2000, 21, pp. 1103-1107) discloses materials with up to about 81 percent vinyl termination made using dimethylsilyl bis(2-methyl,4-phenyl-indenyl) zirconium dichloride and methylalumoxane in toluene at about 120° C. The materials have a Mn of about 12,300 (measured with $^1$H NMR) and a melting point of about 143° C.

Macromolecules, 33, 2000, pp. 8541-8548 discloses preparation of branch-block ethylene-butene polymer made by reincorporation of vinyl terminated polyethylene, said branch-block polymer made by a combination of $Cp_2ZrCL_2$ and $(C_5Me_4SiMe_2NC_{12}H_{23})TiCl_2$ activated with methylalumoxane.

Moscardi et al. (Organometallics, 20, 2001, pg. 1918) discloses the use of rac-dimethylsilylmethylenebis(3-t-butyl indenyl)zirconium dichloride with methylalumoxane in batch polymerizations of propylene to produce materials where " . . . allyl end group always prevails over any other end groups, at any [propene]." In these reactions, morphology control was limited and approximately 60% of the chain ends are allylic.

Coates et al. (Macromolecules, 38, 2005, pg. 6259) discloses preparation of low molecular weight syndiotactic polypropylene ([rrrr]=0.46-0.93) with about 100% allyl end groups using bis(phenoxyimine)titanium dichloride ($(PHI)_2TiCl_2$) activated with modified methyl alumoxane (MMAO; Al/Ti molar ratio=200) in batch polymerizations run between −20° C. and +20° C. for four hours. For these polymerizations, propylene was dissolved in toluene to create a 1.65 M toluene solution. Catalyst productivity was very low (0.95 to 1.14 g/mmol Ti/hr).

JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers that do not have a significant amount of amorphous material.

Rose et al. (Macromolecules, 41, 2008, pp. 559-567) discloses poly(ethylene-co-propylene) macromonomers not having significant amounts of iso-butyl chain ends. Those were made with bis(phenoxyimine) titanium dichloride ($(PHI)_2TiCl_2$) activated with modified methylalumoxane (MMAO; Al/Ti molar ratio range 150 to 292) in semi-batch polymerizations (30 psi propylene added to toluene at 0° C. for 30 min, followed by ethylene gas flow at 32 psi of overpressure at about 0° C. for polymerization times of 2.3 to 4 hours to produce E-P copolymer having an Mn of about 4,800 to 23,300. In four reported copolymerizations, allylic chain ends decreased with increasing ethylene incorporation roughly according to the equation:

% allylic chain ends (of total unsaturations)=−0.95 (mol % ethylene incorporated)+100.

For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from $0.78 \times 10^2$ g/mmol Ti/hr to $4.62 \times 10^2$ g/mmol Ti/hr.

Prior to this work, Zhu et al. reported only low (−38%) vinyl terminated ethylene-propylene copolymer made with the constrained geometry metallocene catalyst $[C_5Me_4(SiMe_2N\text{-tert-butyl})TiMe_2]$ activated with $B(C_6F_5)_3$ and MMAO (Macromolecules, 35, 2002, pp. 10062-10070 and Macromolecules Rap. Commun., 24, 2003, pp. 311-315).

Janiak and Blank summarize a variety of work related to oligomerization of olefins (Macromol. Symp., 236, 2006, pp. 14-22).

However, higher olefin copolymerizations to produce allyl terminated higher olefin copolymers are not known. Accordingly, there is a need for new catalysts that produce allyl terminated higher olefin copolymers, particularly in high yields, with a wide range of molecular weight, and with high catalyst activity. Further, there is a need for higher olefin copolymers macromonomers that have allyl termination present in high amounts (40% or more), with control over a wide range of molecular weights that can be made at commercial temperatures and which can be made at commercial rates (5,000 g/mmol/hr productivity or more). Further, there is a need for higher olefin copolymer reactive materials having allyl termination which can be functionalized and used in additive applications, or as macromonomers for the synthesis of poly(macromonomers).

SUMMARY OF THE INVENTION

This invention relates to higher olefin copolymers having an Mn (measured by $^1$H NMR) of 300 g/mol or greater (preferably 300 to 60,000 g/mol) comprising: (i) from about 20 to 99.9 mol % of at least one $C_5$ to $C_{40}$ higher olefin; and (ii) from about 0.1 to 80 mol % of propylene; wherein the higher olefin copolymer has at least 40% allyl chain ends.

This invention relates to higher olefin copolymers having an Mn (measured by $^1$H NMR) of 300 g/mol or greater (preferably 300 to 60,000 g/mol) comprising: (i) from about 80 to 99.9 mol % of at least one $C_4$ olefin; and (ii) from about 0.1 to 20 mol % of propylene; wherein the higher olefin copolymer has at least 40% allyl chain ends.

This invention also relates to a process for making higher olefin copolymers, wherein the process comprises contacting, under polymerization conditions: (i) 20 to 99.9 mol % of at least one $C_5$ to $C_{40}$ higher olefin; and (ii) 0.1 to 80 mol % of propylene; wherein the contacting occurs in the presence of a catalyst system comprising an activator and at least one metallocene compound represented by at least one of the formulae:

FORMULA I

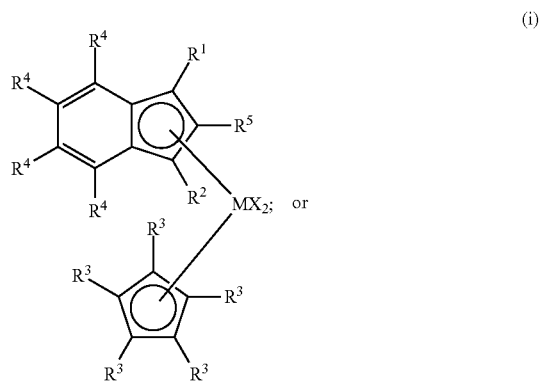

FORMULA II

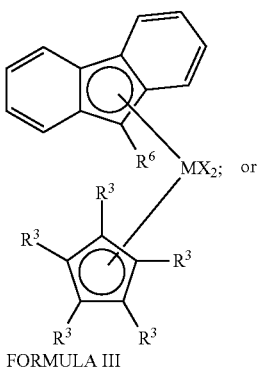

FORMULA III

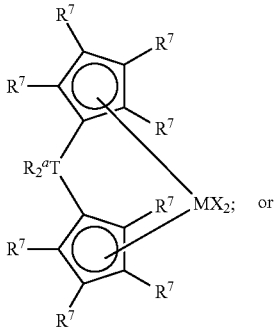

FORMULA IV

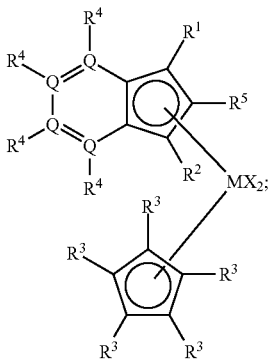

where M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system); each Q is, independently carbon or a heteroatom; each $R^1$ is, independently, a $C_1$ to $C_8$ alkyl group, $R^1$ may the same or different as $R^2$; each $R^2$ is, independently, a $C_1$ to $C_8$ alkyl group; each $R^3$ is, independently, hydrogen, or a substituted or unsubstituted hydrocarbyl group having from 1 to 8 carbon atoms, provided however that at least three $R^3$ groups are not hydrogen; each $R^4$ is, independently, hydrogen or a substituted or unsubstituted hydrocarbyl group, a heteroatom or heteroatom containing group; $R^5$ is hydrogen or a $C_1$ to $C_8$ alkyl group; $R^6$ is hydrogen or a $C_1$ to $C_8$ alkyl group; each $R^7$ is, independently, hydrogen, or a $C_1$ to $C_8$ alkyl group, provided however that at least seven $R^7$ groups are not hydrogen; $R_2{}^aT$ is a bridging group where T is a group 14 element (preferably C, Si, or Ge, preferably Si) and each $R^a$ is, independently, hydrogen, halogen or a $C_1$ to $C_{20}$ hydrocarbyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated;

or

FORMULA V

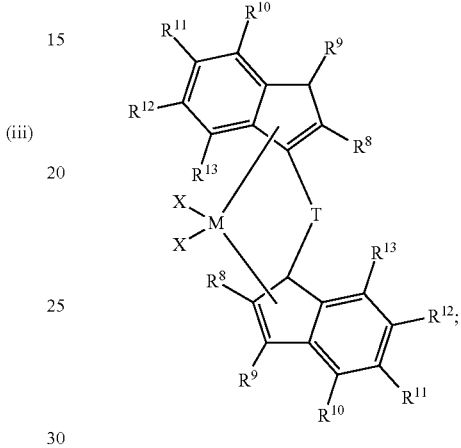

where M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R^8$ is, independently, a $C_1$ to $C_{10}$ alkyl group; each $R^9$ is, independently, a $C_1$ to $C_{10}$ alkyl group; each $R^{10}$ is hydrogen; each $R^{11}$, $R^{12}$, and $R^{13}$, is, independently, hydrogen or a substituted or unsubstituted hydrocarbyl group, a heteroatom or heteroatom containing group; T is a bridging group; and further provided that any of adjacent $R^{11}$, $R^{12}$, and $R^{13}$ groups may form a fused ring or multicenter fused ring system where the rings may be aromatic, partially saturated or saturated;

or

FORMULA VI

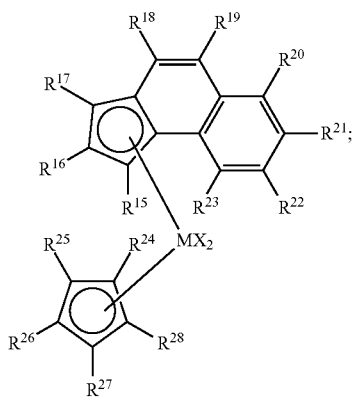

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group; and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms.

This invention also relates to a process for making higher olefin copolymers, wherein the process comprises contacting, under polymerization conditions: (i) 80 to 99.9 mol % of at least one $C_4$ olefin; and (ii) 0.1 to 20 mol % of propylene; wherein the contacting occurs in the presence of a catalyst system comprising an activator and at least one metallocene compound represented by at least one of the formulae:

FORMULA I (i)

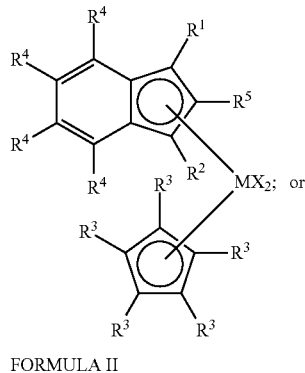

FORMULA II (ii)

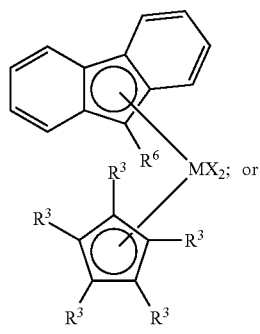

FORMULA III (iii)

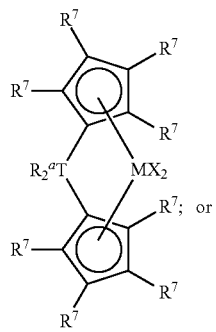

FORMULA IV (iv)

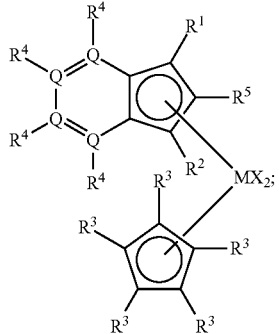

where M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system); each Q is, independently carbon or a heteroatom; each $R^1$ is, independently, a $C_1$ to $C_8$ alkyl group, $R^1$ may the same or different as $R^2$; each $R^2$ is, independently, a $C_1$ to $C_8$ alkyl group; each $R^3$ is, independently, hydrogen, or a substituted or unsubstituted hydrocarbyl group having from 1 to 8 carbon atoms, provided however that at least three $R^3$ groups are not hydrogen; each $R^4$ is, independently, hydrogen or a substituted or unsubstituted hydrocarbyl group, a heteroatom or heteroatom containing group; $R^5$ is hydrogen or a $C_1$ to $C_8$ alkyl group; $R^6$ is hydrogen or a $C_1$ to $C_8$ alkyl group; each $R^7$ is, independently, hydrogen, or a $C_1$ to $C_8$ alkyl group, provided however that at least seven $R^7$ groups are not hydrogen; $R_2{}^aT$ is a bridging group where T is a group 14 element (preferably C, Si, or Ge, preferably Si); and each $R^a$ is, independently, hydrogen, halogen or a $C_1$ to $C_{20}$ hydrocarbyl, and two $R^a$ can form a cyclic structure including aromatic, partially saturated or saturated cyclic or fused ring system; and further provided that any two adjacent R groups may form a fused ring or multicenter fused ring system where the rings may be aromatic, partially saturated or saturated;

FORMULA V (v)

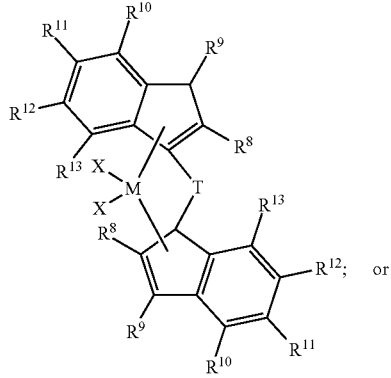

where M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R^8$ is, independently, a $C_1$ to $C_{10}$ alkyl group; each $R^9$ is, independently, a $C_1$ to $C_{10}$ alkyl group; each $R^{10}$ is hydrogen; each $R^{11}$, $R^{12}$, and $R^{13}$, is, independently, hydrogen or a substituted or unsubstituted hydrocarbyl group, a heteroatom or heteroatom containing group; T is a bridging group (such as $R_2"T$ as defined above); and further provided that any of adjacent $R^{11}$, $R^{12}$, and $R^{13}$ groups may form a fused ring or multicenter fused ring system where the rings may be aromatic, partially saturated or saturated;

FORMULA VI

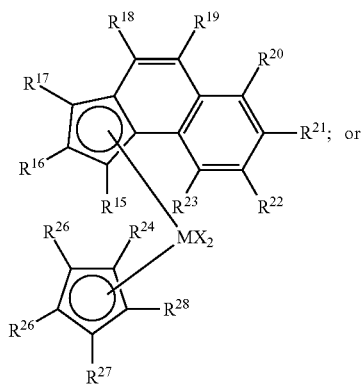

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group; and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms.

This invention even further relates to a composition comprising a higher olefin copolymer having an Mn (measured by $^1$H NMR) of greater than 200 g/mol comprising: (i) from about 20 to 99.9 mol % of at least one $C_5$ to $C_{40}$ higher olefin; and (ii) from about 0.1 to 80 mol % of propylene; wherein the higher olefin copolymer has at least 40% allyl chain ends.

This invention even further relates to a composition comprising a higher olefin copolymer having an Mn (measured by $^1$H NMR) of greater than 200 g/mol comprising: (i) from about 80 to 99.9 mol % of at least one $C_4$ olefin; and (ii) from about 0.1 to 20 mol % of propylene; wherein the higher olefin copolymer has at least 40% allyl chain ends.

The invention yet further relates to the use of the compositions disclosed herein as lubricants.

BRIEF DESCRIPTION OF THE DRAWINGS

FIG. 1 is a plot of viscosity as a function of temperature for representative allyl terminated hexene-propylene copolymers as compared to allyl terminated propylene homopolymers.

DETAILED DESCRIPTION

The inventors have surprisingly discovered a new class of vinyl terminated polymers. Described herein are vinyl terminated higher olefin copolymers, processes to produce such vinyl terminated higher olefin copolymers, and compositions comprising vinyl terminated higher olefin copolymers. These vinyl terminated higher olefin copolymers may find utility as macromonomers for the synthesis of poly(macromonomers), block copolymers, and as additives, for example, as additives to lubricants. Advantageously, the vinyl group of these vinyl terminated copolymers provides a path to functionalization. These functionalized copolymers may be also useful as additives, such as in lubricants.

As used herein, "molecular weight" means number average molecular weight (Mn), unless otherwise stated.

For the purposes of this invention and the claims thereto, the new numbering scheme for the Periodic Table Groups is used as in CHEMICAL AND ENGINEERING NEWS, 63(5), pg. 27 (1985). Therefore, a "Group 4 metal" is an element from Group 4 of the Periodic Table.

"Catalyst activity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. "Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. The term "polymer," as used herein, includes oligomers (up to 100 mer units), and larger polymers (greater than 100 mer units). A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

"Higher olefin," as used herein, means $C_4$ to $C_{40}$ olefins; preferably $C_5$ to $C_{30}$ α-olefins; more preferably $C_5$-$C_{20}$ α-olefins; or even more preferably, $C_5$-$C_{12}$ α-olefins. A "higher olefin copolymer" is a polymer comprising two or more different monomer units (where different means the monomer units differ by at least one atom), at least one of which is a higher olefin monomer unit.

As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC), wt % is weight percent, mol % is mole percent, vol % is volume percent and mol is mole. Molecular weight distribution (MWD) is defined to be Mw (measured by GPC) divided by Mn (measured by GPC), Mw/Mn. Unless otherwise noted, all molecular weights (e.g., Mw, Mn, Mz) have units of g/mol.

Vinyl Terminated Copolymers

In a preferred embodiment, the vinyl terminated higher olefin (VT-HO) copolymers described herein have an Mn (measured by $^1$H NMR) of greater than 200 g/mol (preferably 300 to 60,000 g/mol, 400 to 50,000 g/mol, 500 to 35,000 g/mol, 300 to 15,000 g/mol, 400 to 12,000 g/mol, or 750 to 10,000 g/mol), and comprise: (i) from about 20 to 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ (preferably $C_6$ to $C_{20}$) higher olefin; and (ii) from about 0.1 to 80 mol % (preferably from about 5 mol % to 70 mol %, from about 10 to about 65 mol %, from about 15 to about 55 mol %, from about 25 to about 50 mol %, or from about 30 to about 80 mol %) of propylene; wherein the VT-HO copolymer has at least 40% allyl chain ends (preferably at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1, and further optionally, an allyl chain end to vinylidene chain end ratio of greater than 2:1 (preferably greater than 2.5:1, greater than 3:1, greater than 5:1, or greater than 10:1); and even further optionally, an allyl chain end to vinylene ratio is greater than 1:1 (preferably greater than 2:1, or greater than 5:1).

In another embodiment, the higher olefin copolymer has an Mn of 300 g/mol or more (measured by $^1$H NMR, preferably 300 to 60,000 g/mol, 400 to 50,000 g/mol, 500 to 35,000 g/mol, 300 to 15,000 g/mol, 400 to 12,000 g/mol, or 750 to 10,000 g/mol), and comprises:

(i) from about 80 to about 99.9 mol % of at least one $C_4$ olefin, preferably about 85 to about 99.9 mol %, more preferably about 90 to about 99.9 mol %;

(ii) from about 0.1 to about 20 mol % of propylene, preferably about 0.1 to about 15 mol %, more preferably about 0.1 to about 10 mol %; and wherein the higher olefin copolymer has at least 40% allyl chain ends (preferably at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1.

The VT-HO polymer may be a copolymer, a terpolymer, or so on.

VT-HO copolymers generally have a saturated chain end (or terminus) and/or an unsaturated chain end, or terminus. The unsaturated chain end of the inventive copolymers comprises the "allyl chain end." An allyl chain end is represented by $CH_2CH-CH_2-$, as shown in formula:

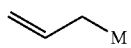

where M represents the copolymer chain. "Allylic vinyl group," "allyl chain end," "vinyl chain end," "vinyl termination," "allylic vinyl group," and "vinyl terminated" are used interchangeably in the following description.

The number of allyl chain ends, vinylidene chain ends and vinylene chain ends is determined using $^1$H NMR at 120° C. using deuterated tetrachloroethane as the solvent on a at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated propylene oligomers in J. American Chemical Soc., 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

In another embodiment, any of the vinyl terminated polyolefins described or useful herein have 3-alkyl vinyl end groups (where the alkyl is a $C_1$ to $C_{38}$ alkyl), also referred to as a "3-alkyl chain ends" or a "3-alkyl vinyl termination", represented by the formula:

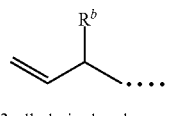

3-alkyl vinyl end group where "••••" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}$C NMR as set out below.

In a preferred embodiment, any of the vinyl terminated polyolefins described or useful herein have at least 5% 3-alkyl chain ends (preferably at least 10% 3-alkyl chain ends, at least 20% 3-alkyl chain ends, at least 30% 3-alkyl chain ends; at least 40% 3-alkyl chain ends, at least 50% 3-alkyl chain ends, at least 60% 3-alkyl chain ends, at least 70% 3-alkyl chain ends; at least 80% 3-alkyl chain ends, at least 90% 3-alkyl chain ends; at least 95% 3-alkyl chain ends, relative to total unsaturations.

In a preferred embodiment, any of the vinyl terminated polyolefins described or useful herein have at least 5% 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80% 3-alkyl+allyl chain ends, at least 90% 3-alkyl+allyl chain ends; at least 95% 3-alkyl+allyl chain ends, relative to total unsaturations.

In some embodiments, the VT-HO copolymer has at least 40% allyl chain ends (at least 50% allyl chain ends, at least 60% allyl chain ends, at least 70% allyl chain ends, at least 80% allyl chain ends, at least 90% allyl chain ends, or at least 95% allyl chain ends).

In another embodiment, any of the vinyl terminated polyolefins described or useful herein have 3-alkyl vinyl end groups (where the alkyl is a $C_1$ to $C_{38}$ alkyl), also referred to as "3-alkyl chain ends" or "3-alkyl vinyl terminations," represented by the formula:

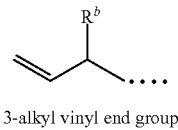

3-alkyl vinyl end group where "••••" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The number of 3-alkyl chain ends is determined using $^{13}C$ NMR as set out below.

In a preferred embodiment, any of the vinyl terminated polyolefins described or useful herein have at least 5% 3-alkyl chain ends (preferably at least 10% 3-alkyl chain ends, at least 20% 3-alkyl chain ends, at least 30% 3-alkyl chain ends; at least 40% 3-alkyl chain ends, at least 50% 3-alkyl chain ends, at least 60% 3-alkyl chain ends, at least 70% 3-alkyl chain ends; at least 80% 3-alkyl chain ends, at least 90% 3-alkyl chain ends; at least 95% 3-alkyl chain ends, relative to total unsaturations.

In a preferred embodiment, any of the vinyl terminated polyolefins described or useful herein have at least 5% 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80% 3-alkyl+allyl chain ends, at least 90% 3-alkyl+allyl chain ends; at least 95% 3-alkyl+allyl chain ends, relative to total unsaturations.

The "allyl chain end to vinylidene chain end ratio" is defined to be the ratio of the percentage of allyl chain ends to the percentage of vinylidene chain ends. In some embodiments, the allyl chain end to vinylidene chain end ratio is more than 2:1 (preferably more than 2.5:1, more than 3:1, more than 5:1, or more than 10:1). In some embodiments, the allyl chain end to vinylidene chain end ratio is in the range of from about 10:1 to about 2:1 (preferably from about 5:1 to about 2:1 or from 10:1 to about 2.5:1).

The "allyl chain end to vinylene chain end ratio" is defined to be the ratio of the percentage of allyl chain ends to the percentage of vinylene chain ends. In some embodiments, the allyl chain end to vinylene ratio is greater than 1:1 (preferably greater than 2:1, or greater than 5:1).

VT-HO copolymers also have a saturated chain end which may comprise an isobutyl chain end or a higher olefin chain end. In a propylene/higher olefin copolymerization, the polymer chain may initiate growth in a propylene monomer, thereby generating an isobutyl chain saturated chain end. Alternately, the polymer chain may initiate growth in a higher olefin monomer, generating a higher olefin chain saturated end.

An "isobutyl chain end" is defined to be an end or terminus of a polymer, represented as shown in the formula below:

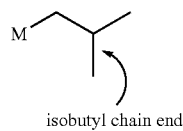

isobutyl chain end where M represents the polymer chain.

A "higher olefin chain end" is defined to be an end or terminus of a polymer, represented as shown in the formula below:

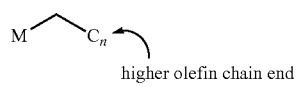

higher olefin chain end where M represents the polymer chain and n is an integer selected from 4 to 40.

The structure of the copolymer near the saturated chain end may differ, depending on the types and amounts of monomer(s) used, and method of insertion during the polymerization process. In some preferred embodiments, the structure of the polymer within four carbons of the isobutyl chain end is represented by one of the following formulae:

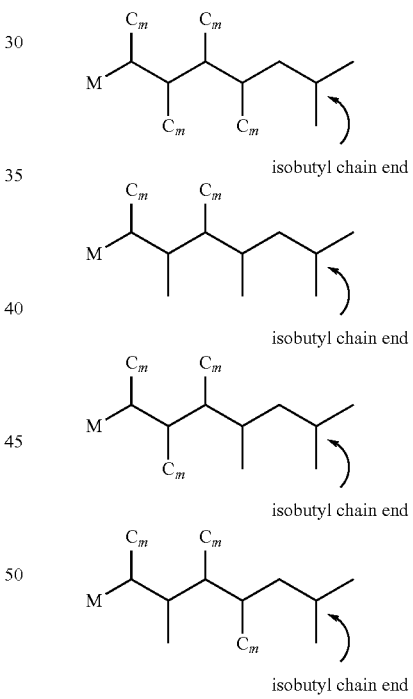

where M represents the rest of the polymer chain and $C_m$ represents the polymerized higher olefin monomer, each $C_m$ may be the same or different, and where m is an integer from 2 to 38.

The percentage of isobutyl chain ends is determined using $^{13}C$ NMR (as described in the Example section) and the chemical shift assignments in Resconi et al, J. Am. Chem. Soc. 114, 1992, pp. 1025-1032 for 100% propylene oligomers and reported herein for VT-HO copolymers.

The "isobutyl chain end to allyl chain end ratio" is defined to be the ratio of the percentage of isobutyl chain ends to the percentage of allyl chain ends. In some embodiments, the isobutyl chain end to allyl chain end is less than 0.70:1 (preferably less than 0.65:1, less than 0.60:1, less than 0.50:1, or less than 0.25:1). In some embodiments, the isobutyl chain end to allyl chain end ratio is in the range of from about 0.01:1 to about 0.70:1 (preferably from about 0.05:1 to about 0.65:1 or from 0.1:1 to about 0.60:1).

The VT-HO copolymer preferably has a Mn, as determined by $^1$H NMR, of 300 g/mol or more (preferably from about 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol). Further, a desirable molecular weight range can be any combination of any upper molecular weight limit with any lower molecular weight limit described above. As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC), and molecular weight distribution (MWD, Mw/Mn) is defined to be Mw (measured by GPC) divided by Mn (measured by GPC). Mn ('H NMR) is determined according to the NMR method described below in the Examples section. Mn may also be determined using a GPC-DRI method, as described below. For the purpose of the claims, Mn is determined by $^1$H NMR.

In another embodiment, the VT-HO copolymers described herein have a Mw (measured using a GPC-DRI method, as described below) of 1,000 g/mol or more (preferably from about 1,000 to about 400,000 g/mol, preferably from about 2,000 to 300,000 g/mol, preferably from about 3,000 to 200,000 g/mol) and/or a Mz in the range of from about 1,700 to about 150,000 g/mol or preferably from about 800 to 100,000 g/mol, and/or an Mw/Mn in the range of from about 1.2 to 20 (alternately from about 1.7 to 10, alternately from about 1.8 to 5.5).

In particular embodiments, the VT-HO copolymer has a Mn of 300 g/mol or more (preferably from about 300 to about 60,000 g/mol, from about 400 to about 50,000 g/mol, from about 500 to about 35,000 g/mol, from about 300 to about 15,000 g/mol, from about 400 to about 12,000 g/mol, or from about 750 to about 10,000 g/mol), a Mw of 1,000 or more (preferably from about 1,000 to about 400,000 g/mol, from about 2,000 to 300,000 g/mol, or from about 3,000 to 200,000 g/mol), and a Mz of from about 1,700 to about 150,000 g/mol or preferably from about 800 to 100,000 g/mol.

Mn, Mw, and Mz are measured by a GPC-DRI method using a High Temperature Size Exclusion Chromatograph (SEC (a type of Gel Permeation Chromatography, GPC), either from Waters Corporation or Polymer Laboratories), equipped with a differential refractive index detector (DRI). Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns are used. The nominal flow rate is 0.5 cm$^3$/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/cm$^3$, molecular weight is expressed in g/mol, and intrinsic viscosity is expressed in dL/g.

In embodiments herein, the VT-HO copolymer comprises from about 20 to about 99.9 mol % (preferably from about 25 to about 90 mol %, from about 30 to about 85 mol %, from about 35 to about 80 mol %, from about 40 to about 75 mol %, or from about 50 to about 95 mol %) of at least one (preferably two or more, three or more, four or more, and the like) $C_5$ to $C_{40}$ (preferably $C_5$ to $C_{30}$, $C_6$ to $C_{20}$, or $C_8$ to $C_{12}$) higher olefin monomers. In other embodiments, the VT-HO copolymer comprises greater than 20 mol % (preferably greater than 30 mol %, greater than 40 mol %, greater than 45 mol %, greater than 50 mol %, greater than 65 mol %, greater than 75 mol %, or greater than 85 mol %) of $C_5$ to $C_{40}$ (preferably $C_5$ to $C_{30}$, $C_6$ to $C_{20}$, or $C_8$ to $C_{12}$) higher olefin monomer. In yet other embodiments, the VT-HO copolymer comprises less than 99.9 mol % (preferably less than 85 mol %, less than 75 mol %, less than 65 mol %, less than 50 mol %, less than 35 mol %, or less than 25 mol %) of $C_5$ to $C_{40}$ higher olefin monomer.

In embodiments herein, the VT-HO copolymer comprises from about 0.1 to about 80 mol % of propylene (preferably from about 5 mol % to about 70 mol %, from about 10 to about 65 mol %, from about 15 to about 55 mol %, from about 25 to about 50 mol %, or from about 30 to about 80 mol %). In other embodiments, the VT-HO copolymer comprises greater than 5 mol % of propylene (preferably greater than 10 mol %, greater than 20 mol %, greater than 35 mol %, greater than 50 mol %, greater than 65 mol %, or greater than 75 mol %). In yet other embodiments, the VT-HO copolymer comprises less than 80 mol % of propylene (preferably less than 75 mol %, less than 70 mol %, less than 65 mol %, less than 50 mol %, less than 35 mol %, less than 20 mol %, or less than 10 mol %).

VT-HO copolymers herein comprise at least one $C_5$ to $C_{40}$ higher olefin and propylene. In some embodiments, the VT-HO copolymers comprise two or more different $C_5$ to $C_{40}$ higher olefin monomers, three or more $C_5$ to $C_{40}$ different higher olefin monomers, or four or more different $C_5$ to $C_{40}$ higher olefin monomer. In some embodiments, the VT-HO copolymer also comprises ethylene and/or butene.

In embodiments where butene is a termonomer, the higher olefin copolymer has an Mn of 300 g/mol or more, preferably 300 to 60,000 g/mol (measured by $^1$H NMR) and comprises: (i) from about 80 to about 99.9 mol % of at least one $C_4$ olefin (preferably about 85 to about 99.9 mol %, more preferably about 90 to about 99.9 mol %); and (ii) from about 0.1 to about 20 mol % of propylene (preferably about 0.1 to about 15 mol % or about 0.1 to about 10 mol %); wherein the higher olefin copolymer has at least 40% allyl chain ends (preferably at least 50% allyl chain ends, at least 60% allyl chain ends, at least 70% allyl chain ends, or at least 80% allyl chain ends); and, in some embodiments, an isobutyl chain end to allyl chain end ratio of less than 0.70:1 (preferably less than 0.65:1, less than 0.60:1, less than 0.50:1, or less than 0.25:1) and in further embodiments, an allyl chain end to vinylidene group ratio of more than 2:1 (preferably more than 2.5:1, more than 3:1, more than 5:1, or more than 10:1).

In a preferred embodiment, the VT-HO copolymer comprises less than 3 wt % of functional groups selected from hydroxide, aryls and substituted aryls, halogens, alkoxys, carboxylates, esters, acrylates, oxygen, nitrogen, and carboxyl (preferably less than 2 wt %, less than 1 wt %, less than 0.5 wt %, less than 0.1 wt %, or 0 wt %), based upon the weight of the copolymer.

In another embodiment, the VT-HO copolymer comprises at least 50 wt % (preferably at least 75 wt %, preferably at least 90 wt %), based upon the weight of the copolymer composition, of olefins having at least 36 carbon atoms (preferably at least 51 carbon atoms or at least 102 carbon atoms) as measured by $^1$H NMR, assuming one unsaturation per chain.

In another embodiment, the VT-HO copolymer comprises less than 20 wt % dimer and trimer (preferably less than 10 wt %, preferably less than 5 wt %, more preferably less than 2 wt %, based upon the weight of the copolymer composition), as measured by GC. "Dimer" (and "trimer") are defined as copolymers having two (or three) monomer units, where the monomer units may be the same or different from each other (where "different" means differing by at least one carbon). Products were analyzed by GC (Agilent 6890N with auto-injector) using helium as a carrier gas at 38 cm/sec. A column having a length of 60 m (J & W Scientific DB-1, 60 m×0.25 mm I.D.×1.0 µm film thickness) packed with a flame ionization detector (FID), an Injector temperature of 250° C., and a Detector temperature of 250° C. were used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, the VT-HO copolymer contains less than 25 ppm hafnium or zirconium, preferably less than 10 ppm hafnium or zirconium, preferably less than 5 ppm hafnium or zirconium, based on the yield of polymer produced and the mass of catalyst employed. ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, is used to determine the amount of an element in a material.

In yet other embodiments, the VT-HO copolymer is a liquid at 25° C.

In another embodiment, the VT-HO copolymers described herein have a melting temperature ($T_m$, DSC first melt) in the range of from 60 to 130° C., alternately 50 to 100° C. In another embodiment, the copolymers described herein have no detectable melting temperature by DSC following storage at ambient temperature (23° C.) for at least 48 hours. The VT-HO copolymer preferably has a glass transition temperature (Tg) of less than 0° C. or less (as determined by Differential Scanning calorimetry as described below), preferably −10° C. or less, more preferably −20° C. or less, more preferably −30° C. or less, more preferably −50° C. or less. Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the VT-HO copolymers described herein have a viscosity at 60° C. of greater than 1,000 cP, greater than 12,000 cP, or greater than 100,000 cP. In other embodiments, the VT-HO copolymers have a viscosity of less than 200,000 cP, less than 150,000 cP, or less than 100,000 cP. Viscosity is defined as resistance to flow is measured at an elevated temperature using a Brookfield Viscometer.

In some embodiments, the VT-HO polymers are propylene/hexene copolymers, propylene/octene copolymers, propylene/decene copolymers, propylene/dodecene copolymers, propylene/hexene/octene terpolymers, propylene/hexene/decene terpolymers, propylene/hexene/dodecene terpolymers, propylene/octene/decene terpolymers, propylene/octene/dodecene terpolymers, propylene/decene/dodecene terpolymers, and the like.

Uses of Vinyl Terminated Higher Olefin Copolymers

The vinyl terminated polymers prepared herein may be functionalized by reacting a heteroatom containing group with the allyl group of the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides).

In some embodiments the vinyl terminated polymers produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739, filed on Jun. 19, 2009.

The functionalized polymers can be used in oil additivation and many other applications. Preferred uses include additives for lubricants and/or fuels. Preferred heteroatom containing groups include, amines, aldehydes, alcohols, acids, succinic acid, maleic acid and maleic anhydride.

In particular embodiments herein, the vinyl terminated polymers disclosed herein, or functionalized analogs thereof, are useful as additives. In some embodiments, the vinyl terminated polymers disclosed herein, or functionalized analogs thereof, are useful as additives to a lubricant. Particular embodiments, relate to a lubricant comprising the vinyl terminated polymers disclosed herein, or functionalized analogs thereof.

In other embodiments, the vinyl terminated polymers disclosed herein may be used as monomers for the preparation of polymer products. Processes that may be used for the preparation of these polymer products include coordinative polymerization and acid-catalyzed polymerization. In some embodiments, the polymeric products may be homopolymers. For example, if a vinyl terminated polymer (A) were used as a monomer, it is possible to form a homopolymer product with the formulation $(A)_n$, where n is the degree of polymerization.

In other embodiments, the polymer products formed from mixtures of monomer vinyl terminated polymers may be mixed polymers, comprising two or more repeating units that are different from each. For example, if a vinyl terminated polymer (A) and a different vinyl terminated polymer (B) were copolymerized, it is possible to form a mixed polymer product with the formulation $(A)_n(B)_m$, where n is the number of molar equivalents of vinyl terminated polymer (A) and m is the number of molar equivalents of vinyl terminated polymer (B) that are present in the mixed polymer product.

In yet other embodiments, polymer products may be formed from mixtures of the vinyl terminated polymer with another alkene. For example, if a vinyl terminated polymer (A) and alkene (B) were copolymerized, it is possible to form a mixed polymer product with the formulation $(A)_n(B)_m$, where n is the number of molar equivalents of vinyl terminated polymer and m is the number of molar equivalents of alkene that are present in the mixed polymer product.

In particular embodiments herein, the invention relates to a composition comprising VT-HO copolymers having an Mn of 300 g/mol or more, preferably of 300 to 60,000 g/mol (measured by $^1$H NMR), 400 to 50,000 g/mol, preferably 500 to 35,000 g/mol, preferably 300 to 15,000 g/mol, preferably 400 to 12,000 g/mol, or preferably 750 to 10,000 g/mol, comprising: (i) from about 20 to 99.9 mol % of at least one $C_5$ to $C_{40}$ higher olefin, from about 25 to about 90 mol %, from about 30 to about 85 mol %, from about 35 to about 80 mol %, from about 40 to about 75 mol %, or from about 50 to about 95 mol %; and (ii) from about 0.1 to about 80 mol % of propylene, from about 5 mol % to about 70 mol %, from about 10 to about 65 mol %, from about 15 to about 55 mol %, from about 25 to about 50 mol %, or from about 30 to about 80 mol %; wherein the VT-HO copolymer has at least 40% allyl chain ends, at least 50% allyl chain ends, at least 60% allyl chain ends, at least 70% allyl chain ends; or at least 80% allyl chain ends; and, optionally, an isobutyl chain end to allyl chain end ratio of less than 0.70:1, less than 0.65:1, less than 0.60:1, less than 0.50:1, or less than 0.25:1, and further optionally, an allyl chain end to vinylidene group ratio of more than 2:1, more than 2.5:1, more than 3:1, more than 5:1, or more than 10:1.

In other embodiments, the invention relates to the use of a composition comprising VT-HO copolymers having an Mn of 300 g/mol or more, preferably 300 to 60,000 g/mol (measured by $^1$H NMR) and comprises: (i) from about 80 to about 99.9 mol % of at least one $C_4$ olefin, preferably about 85 to about 99.9 mol %, more preferably about 90 to about 99.9 mol %; and (ii) from about 0.1 to about 20 mol % of propylene, preferably about 0.1 to about 15 mol %, more preferably about 0.1 to about 10 mol %; wherein the higher olefin copolymer has at least 40% allyl chain ends, preferably at least 50% allyl chain ends, preferably at least 60% allyl chain ends, preferably at least 70% allyl chain ends, or preferably at least 80% allyl chain ends; in some embodiments, an isobutyl chain end to allyl chain end ratio of less than 0.70:1, less than 0.65:1, less than 0.60:1, less than 0.50:1, or less than 0.25:1; and, in further embodiments, an allyl chain end to vinylidene group ratio of more than 2:1, more than 2.5:1, more than 3:1, more than 5:1, or more than 10:1.

In some embodiments, the composition is a lubricant blend.

In some embodiments, the invention relates to the use of the composition as a lubricant blend.

Processes for Making Vinyl Terminated-Higher Olefin Copolymers

This invention also relates to relates to a process for making higher olefin copolymers, wherein the process comprises contacting, at a temperature of from 0 to 250° C., (preferably 35 to 150° C., preferably from 40 to 120° C., preferably from 45 to 80° C.): (i) from about 20 to about 99.9 mol % of at least one $C_5$ to $C_{40}$ higher olefin (preferably from about 25 to about 90 mol %, from about 30 to about 85 mol %, from about 35 to about 80 mol %, from about 40 to about 75 mol %, or from about 50 to about 95 mol %); and (ii) from about 0.1 to about 80 mol % of propylene (preferably from about 5 mol % to about 70 mol %, from about 10 to about 65 mol %, from about 15 to about 55 mol %, from about 25 to about 50 mol %, or from about 30 to about 80 mol %); wherein the contacting occurs in the presence of a catalyst system comprising an activator and at least one metallocene compound represented by at least one of the formulae:

FORMULA I

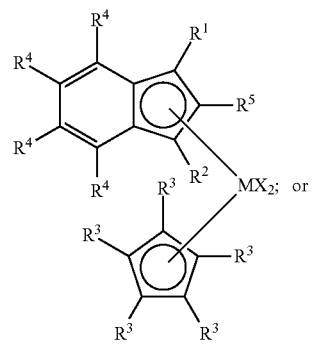

(i)

FORMULA II

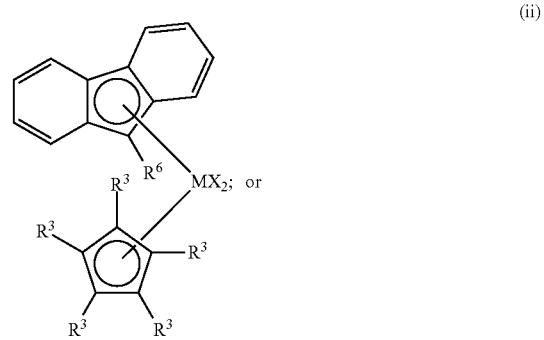

(ii)

FORMULA III

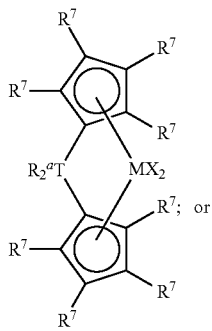

(iii)

FORMULA IV

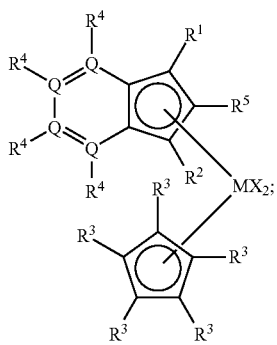

(iv)

where M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system); each Q is, independently carbon or a heteroatom; each $R^1$ is, independently, a $C_1$ to $C_8$ alkyl group, $R^1$ may the same or different as $R^2$; each $R^2$ is, independently, a $C_1$ to $C_8$ alkyl group; each $R^3$ is, independently, hydrogen, or a substituted or unsubstituted hydrocarbyl group having from 1 to 8 carbon atoms, provided however that at least three $R^3$ groups are not hydrogen; each $R^4$ is, independently, hydrogen or a substituted or unsubstituted hydrocarbyl group, a heteroatom or heteroatom containing group; $R^5$ is hydrogen or a $C_1$ to $C_8$ alkyl group; $R^6$ is hydrogen or a $C_1$ to $C_8$ alkyl group; each $R^7$ is, independently, hydrogen or a $C_1$ to $C_8$ alkyl group, provided however that at least seven $R^7$ groups are not hydrogen; $R_2^aT$ is a bridging group where T is a group 14 element (preferably C, Si, or Ge, preferably Si) and each $R^a$ is, independently, hydrogen, halogen or a $C_1$ to $C_{20}$ hydrocarbyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated;

or

FORMULA V

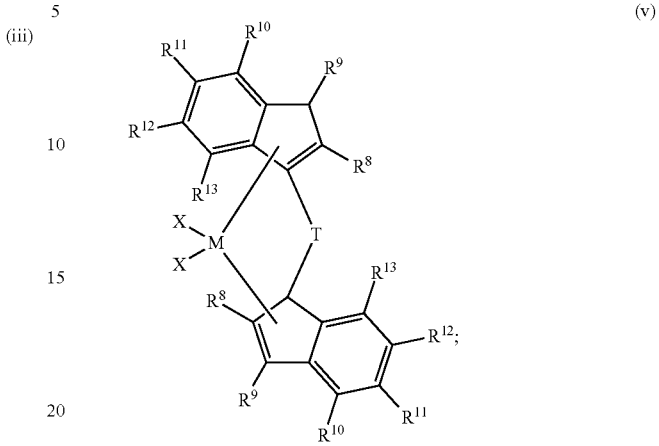

(v)

where M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R^8$ is, independently, a $C_1$ to $C_{10}$ alkyl group; each $R^9$ is, independently, a $C_1$ to $C_{10}$ alkyl group; each $R^{10}$ is hydrogen; each $R^{11}$, $R^{12}$, and $R^{13}$, is, independently, hydrogen or a substituted or unsubstituted hydrocarbyl group, a heteroatom or heteroatom containing group; T is a bridging group (such as $R_2^aT$ as described above); and further provided that any of adjacent $R^{11}$, $R^{12}$, and $R^{13}$ groups may form a fused ring or multicenter fused ring system where the rings may be aromatic, partially saturated or saturated;

or

FORMULA VI

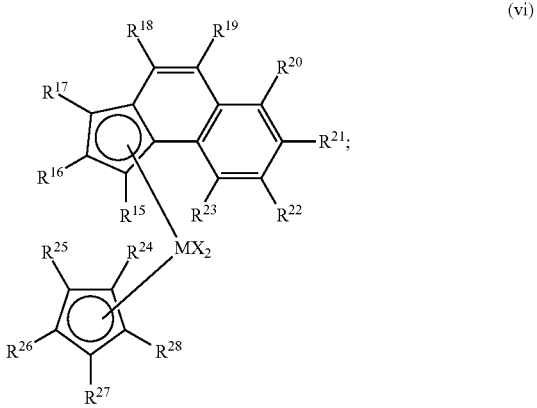

(vi)

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group; and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms.

This invention also relates to a process for making higher olefin copolymers, wherein the process comprises contacting, under polymerization conditions: (i) from about 80 to about 99.9 mol % of at least one $C_4$ olefin, preferably about 85 to about 99.9 mol %, more preferably about 90 to about 99.9 mol %; and (ii) from about 0.1 to about 20 mol % of propylene, preferably about 0.1 to about 15 about mol %, more preferably about 0.1 to about 10 mol %; wherein the contacting occurs in the presence of a catalyst system comprising an activator and at least one metallocene compound represented by at least one of the formulae:

FORMULA I (i)

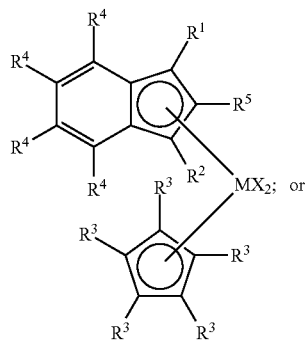

FORMULA II (ii)

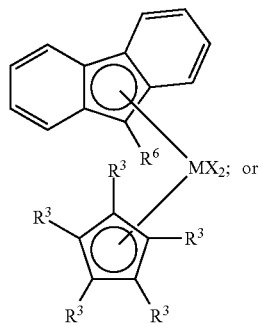

FORMULA III (iii)

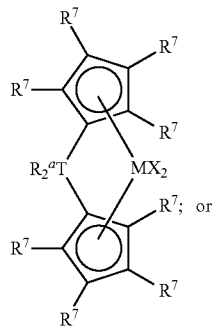

FORMULA IV (iv)

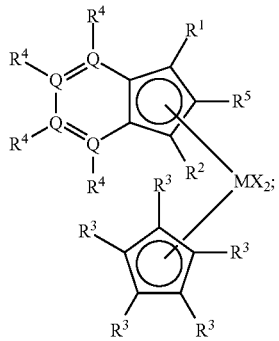

where M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system); each Q is, independently carbon or a heteroatom; each $R^1$ is, independently, a $C_1$ to $C_8$ alkyl group, $R^1$ may the same or different as $R^2$; each $R^2$ is, independently, a $C_1$ to $C_8$ alkyl group; each $R^3$ is, independently, hydrogen or a substituted or unsubstituted hydrocarbyl group having from 1 to 8 carbon atoms, provided however that at least three $R^3$ groups are not hydrogen; each $R^4$ is, independently, hydrogen or a substituted or unsubstituted hydrocarbyl group, a heteroatom or heteroatom containing group; $R^5$ is hydrogen or a $C_1$ to $C_8$ alkyl group; $R^6$ is hydrogen or a $C_1$ to $C_8$ alkyl group; each $R^7$ is, independently, hydrogen, or a $C_1$ to $C_8$ alkyl group, provided however that at least seven $R^7$ groups are not hydrogen; $R_2{}^aT$ is a bridging group where T is a group 14 element (preferably C, Si, or Ge, preferably Si) and each $R^a$ is, is independently, hydrogen, halogen or a $C_1$ to $C_{20}$ hydrocarbyl, and two $R^a$ can form a cyclic structure including aromatic, partially saturated or saturated cyclic or fused ring system; and further provided that any two adjacent R groups may form a fused ring or multicenter fused ring system where the rings may be aromatic, partially saturated or saturated;

or

FORMULA V (v)

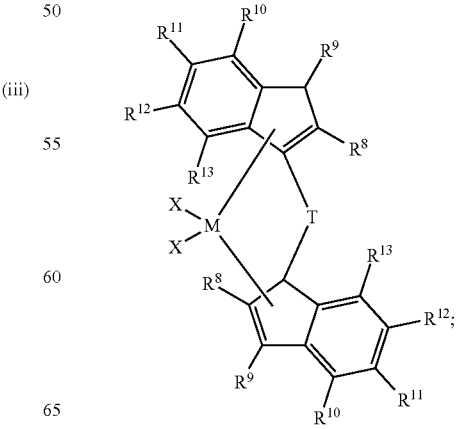

where M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R^8$ is, independently, a $C_1$ to $C_{10}$ alkyl group; each $R^9$ is, independently, a $C_1$ to $C_{10}$ alkyl group; each $R^{10}$ is hydrogen; each $R^{11}$, $R^{12}$, and $R^{13}$, is, independently, hydrogen or a substituted or unsubstituted hydrocarbyl group, a heteroatom or heteroatom containing group; T is a bridging group (such as $R_2''T$ as described above); and further provided that any of adjacent $R^{11}$, $R^{12}$, and $R^{13}$ groups may form a fused ring or multicenter fused ring system where the rings may be aromatic, partially saturated or saturated;

FORMULA VI

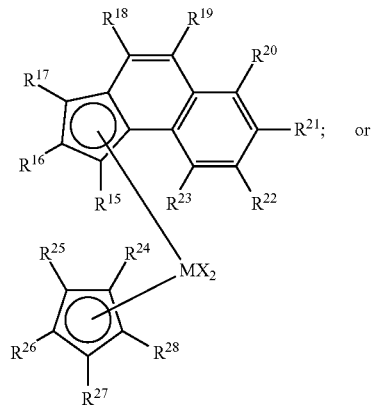

(vi)

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group; and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms.

Generally, to make the VT-HO copolymers described herein, propylene and higher olefin monomers (such as hexene or octene) may be copolymerized by contacting: (i) one or more higher olefin monomer(s); and (ii) propylene monomer; wherein the contacting occurs in the presence of a catalyst system (comprising one or more metallocene compounds, and one or more activators, described below). Other additives may also be used, as desired, such as one or more scavengers, promoters, modifiers, reducing agents, oxidizing agents, hydrogen, aluminum alkyls, or silanes. In a preferred embodiment, little or no scavenger is used in the process to produce the VT-HO copolymers. Preferably, scavenger is present at zero mol %, alternately, the scavenger is present at a molar ratio of scavenger metal to transition metal of less than 100:1, preferably less than 50:1, preferably less than 15:1, preferably less than 10:1.

Higher olefin monomers useful herein are $C_4$ to $C_{40}$ olefins, preferably $C_5$ to $C_{30}$ olefins, preferably $C_6$ to $C_{20}$ olefins, or preferably $C_8$ to $C_{12}$ olefins. Where butene is the comonomer, the butene source may be a mixed butene stream comprising various isomers of butene. The 1-butene monomers are expected to be preferentially consumed by the polymerization process.

The higher olefin monomers may be linear or cyclic. The higher olefin cyclic olefins may be strained or unstrained, monocyclic or polycyclic, and may optionally include hetero atoms and/or one or more functional groups. Exemplary higher olefin monomers include butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexene, heptene, octene, nonene, decene, dodecene, cyclooctene, 1-hydroxy-4-cyclooctene, 1-acetoxy-4-cyclooctene, cyclopentene, norbornene, and their respective homologs and derivatives.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Processes of this invention can be carried out in any manner known in the art. Any suspension, homogeneous bulk, solution, slurry, or gas phase polymerization process known in the art can be used. Such processes can be run in a batch, semibatch, or continuous mode. Homogeneous polymerization processes and slurry are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g. propane in propylene).

In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopar™); perhalogenated hydrocarbons such as perfluorinated $C_{4-10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In a preferred embodiment, the feed concentration for the polymerization is 60 vol % solvent or less, preferably 40 vol % or less, or preferably 20 vol % or less, preferably 0 vol % based on the total volume of the feedstream. Preferably the polymerization is run in a bulk process.

In some embodiments, the productivity is 4,500 g/mmol/hour or more, preferably 5,000 g/mmol/hour or more, preferably 10,000 g/mmol/hr or more, preferably 50,000 g/mmol/hr or more. In other embodiments, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr. In an alternate embodiment, the activity of the catalyst is at least 50 g/mmol/hour, preferably 500 or more g/mmol/hour, preferably 5,000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

Preferred polymerizations can be run at any temperature and/or pressure suitable to obtain the desired VT-HO copolymers. Typical temperatures and/or pressures, such as at a temperature in the range of from about 0° C. to 250° C. (preferably 35° C. to 150° C., from 40° C. to 120° C., from 45° C. to 80° C.); and at a pressure in the range of from about 0.35 to 10 MPa (preferably from 0.45 to 6 MPa or from 0.5 to 4 MPa).

In a typical polymerization, the run time of the reaction is up to 300 minutes, preferably in the range of from about 5 to 250 minutes, or preferably from about 10 to 120 minutes.

In a preferred embodiment hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably, the catalyst activity (calculated as g/mmol catalyst/hr) is at least 20% higher than the same reaction without hydrogen present, preferably at least 50% higher, preferably at least 100% higher.

In a preferred embodiment, little or no alumoxane is used in the process to produce the vinyl terminated polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polymers then, the alumoxane has been treated to remove free alkyl aluminum compounds, particularly trimethyl aluminum.

Further, in a preferred embodiment, the activator used herein to produce the vinyl terminated polymer is a bulky activator as defined herein and is discrete.

In a preferred embodiment, little or no scavenger is used in the process to produce the vinyl terminated polymers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.), and 2) is conducted at a pressure of atmospheric pressure to 10 MPa (preferably 0.35 to 10 MPa, preferably from 0.45 to 6 MPa, preferably from 0.5 to 4 MPa), and 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at less than 0.5 wt %, preferably at 0 wt % based upon the weight of the solvents); and 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; and 5) the polymerization occurs in one reaction zone; and 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); and 7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Catalyst Systems

In embodiments herein, the invention relates to a process for making higher olefin copolymers, wherein the process comprises contacting the propylene and higher olefin monomers in the presence of a catalyst system comprising an activator and at least one metallocene compound, as shown below.

In the description herein, the metallocene catalyst may be described as a catalyst precursor, a pre-catalyst compound, or a transition metal compound, and these terms are used interchangeably. A polymerization catalyst system is a catalyst system that can polymerize monomers to polymer. A "catalyst system" is combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof.

The metallocene, activator, optional co-activator, and optional support components of the catalyst system are discussed below.

(a) Metallocene Component

The term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The metallocene component of the catalyst system is represented by at least one of the formulae I, II, III, IV, V, or VI.

(i) Formulae I, II, III, and IV

In some embodiments, the metallocene compound is represented by at least one of Formulae I, II, III, and IV.

FORMULA I

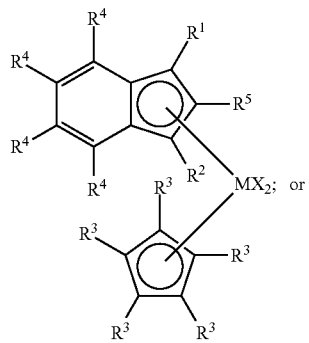

FORMULA II

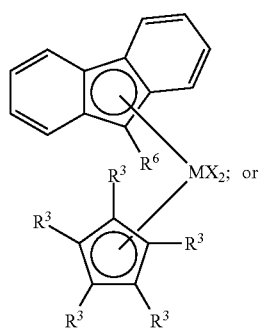

FORMULA III

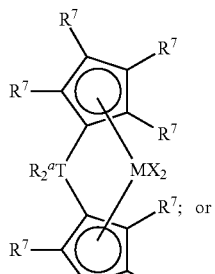

FORMULA IV

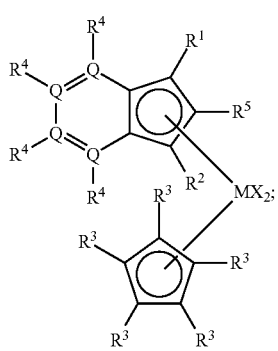

where M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; preferably methyl, ethyl, propyl, butyl, phenyl, benzyl, chloride, bromide, iodide, (alternately two X's may form a part of a fused ring or a ring system);

each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);

each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;

each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, provided that at least one of $R^1$ or $R^2$ is not hydrogen, preferably both of $R^1$ and $R^2$ are not hydrogen, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen);

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

each $R^7$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

$R_2{}^aT$ is a bridging group, preferably T is C, Si or Ge, preferably Si;

each $R^a$, is independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

In some embodiments, the bridging group $R_2{}^aT$ includes bridging groups containing at least one Group 13 to 16 atom, often referred to as a divalent moiety, such as, but not limited to, at least one of a carbon, oxygen, nitrogen, silicon, aluminum, boron, germanium and tin atom, or a combination thereof. Preferably, bridging group T contains a carbon, silicon or germanium atom, most preferably, T contains at least one silicon atom or at least one carbon atom. The bridging group T may also contain substituent groups R* as defined below including halogens and iron.

Non-limiting examples of substituent groups R* include one or more from the group selected from hydrogen, or linear, or branched alkyl radicals, alkenyl radicals, alkenyl radicals, cycloalkyl radicals, aryl radicals, acyl radicals, aryl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, arylamino radicals or combination thereof. In a preferred embodiment, substituent groups R* have up to 50 non-hydrogen atoms, preferably from 1 to 30 carbon, that may also be substituted with halogens or heteroatoms or the like. Non-limiting examples of alkyl substituents R* include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R* include the atoms carbon, silicon, boron, aluminum, nitrogen, phosphorous, oxygen, tin, sulfur, germanium and the like, including olefins, such as, but not limited to, olefinically unsaturated substituents including vinyl-terminated ligands, for example, but-3-enyl, prop-2-enyl, hex-5-enyl and the like. Also, in some embodiments, at least two R* groups, preferably two adjacent R groups, are joined to form a ring structure having from 3 to 30 atoms selected from carbon, nitrogen, oxygen, phosphorous, silicon, germanium, aluminum, boron or a combination thereof. In other embodiments, R* may also be a diradical bonded to L at one end and forming a carbon sigma bond to the metal M. Particularly preferred, R* substituent groups include a $C_1$ to $C_{30}$ hydrocarbyl, a heteroatom or heteroatom containing group (preferably methyl, ethyl, propyl (including isopropyl, sec-propyl), butyl (including t-butyl and sec-butyl), neopentyl, cyclopentyl, hexyl, octyl, nonyl, decyl, phenyl, substituted phenyl, benzyl (including substituted benzyl), cyclohexyl, cyclododecyl, norbornyl, and all isomers thereof.

Examples of bridging group $R_2{}^aT$ in formula III or T in formula V useful herein may be represented by $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'_2C—O—CR'_2$, $R'_2CR'_2C—O—CR'_2CR'_2$, $R'_2C—O—CR'_2CR'_2$, $R'_2C-\beta-CR'=CR'$, $R'_2C—S—CR'_2$, $R'_2CR'_2C—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1-C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, the bridging group comprises carbon or silica, such as dialkylsilyl, preferably the bridging group is selected from $CH_2$, $CH_2CH_2$, $C(CH_3)_2$, $SiMe_2$, $SiPh_2$, $SiMePh$, silylcyclobutyl $(Si(CH_2)_3$, $(Ph)_2C$, $(p-(Et)_3SiPh)_2C$ and silylcyclopentyl $(Si(CH_2)_4)$.

Catalyst compounds that are particularly useful in this invention include one or more of:
(1,3-dimethylindenyl)(pentamethylcyclopentadienyl)hafniumdimethyl,
(1,3,4,7-tetramethylindenyl)(pentamethylcyclopentadienyl) hafniumdimethyl,
(1,3-dimethylindenyl)(tetramethylcyclopentadienyl)hafniumdimethyl,
(1,3-diethylindenyl)(pentamethylcyclopentadienyl)hafniumdimethyl,
(1,3-dipropylindenyl)(pentamethylcyclopentadienyl)hathiumdimethyl,
(1-methyl,3-propyllindenyl)(pentamethylcyclopentadienyl) hafniumdimethyl,
(1,3-dimethylindenyl)(tetramethylpropylcyclopentadienyl) hafniumdimethyl, (1,2,3-trimethylindenyl)(pentamethylcyclopentadienyl) hafniumdimethyl,
(1,3-dimethylbenzindenyl)(pentamethylcyclopentadienyl) hafniumdimethyl,
(2,7-bis t-butylfluorenyl)(pentamethylcyclopentadienyl) hafniumdimethyl,
(9-methylfluorenyl)(pentamethylcyclopentadienyl)hathiumdimethyl,
(2,7,9-trimethylfluorenyl)(pentamethylcyclopentadienyl) hafniumdimethyl,
dihydrosilylbis(tetramethylcyclopentadienyl)hafniumdimethyl,
dihydrosilylbis(tetramethylcyclopentadienyl)hafniumdimethyl,
dimethylsilyl(tetramethylcyclopentadienyl)(3-propyltrimethylcyclopentadienyl)hafniumdimethyl, and
dicyclopropylsilylbis(tetramethylcyclopentadienyl)hafniumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

(ii) Formula V

In some embodiments, the metallocene may be represented by Formula V, below.

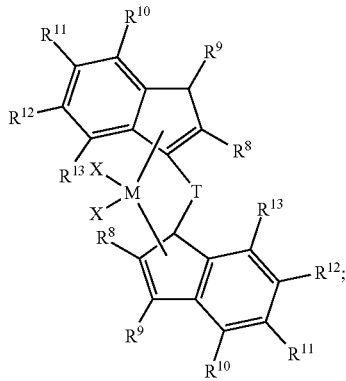

FORMULA V where M is hafnium or zirconium, preferably hafnium;
each X is, independently, selected from the group consisting of a substituted or unsubstituted hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system); preferably each X is independently selected from halides and $C_1$ to $C_6$ hydrocarbyl groups, preferably each X is methyl, ethyl, propyl, butyl, phenyl, benzyl, chloride, bromide, or iodide;
each $R^8$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or n-butyl; or preferably methyl;
each $R^9$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or butyl; or preferably n-propyl;
each $R^{10}$ is hydrogen;
each $R^{11}$, $R^{12}$, and $R^{13}$, is, independently, hydrogen or a substituted or unsubstituted hydrocarbyl group, a heteroatom or heteroatom containing group; preferably each $R^{11}$, $R^{12}$, and $R^{13}$, is hydrogen;
T is a bridging group represented by the formula $R_2{}^aJ$ where J is C, Si or Ge, preferably Si;
each $R^a$ is, independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated or saturated cyclic or fused ring system;
further provided that any two adjacent R groups may form a fused ring or multicenter fused ring system where the rings may be aromatic, partially saturated or saturated. T may also be a bridging group as defined above for $R_2{}^aT$; and
further provided that any of adjacent $R^{11}$, $R^{12}$, and $R^{13}$ groups may form a fused ring or multicenter fused ring system where the rings may be aromatic, partially saturated or saturated.

Metallocene compounds that are particularly useful in this invention include one or more of:
rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl;
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylgermanyl bis(2-methyl,3-propylindenyl)hafniumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl) hafniumdimethyl,
rac-dimethylgermanyl bis(2-methyl,3-isopropylindenyl)zirconiumdimethyl,
rac-dimethylgermanyl bis(2-methyl,3-butylindenyl)hafniumdimethyl,
rac-dimethylgermanyl bis(2-methyl,3-propylindenyl)zirconiumdimethyl,
rac-dimethylsilyl bis(2-propyl,3-methylindenyl)hafniumdimethyl,
rac-dimethylsilyl bis(2-propyl,3-ethylindenyl)hafniumdimethyl,
rac-dimethylsilyl bis(2-propyl,3-butylindenyl)hafniumdimethyl, rac-dimethylsilyl bis(2-methyl,3-butylindenyl)hafniumdimethyl,
rac-dimethylgermanyl bis(2,3-dimethylindenyl)hafnium dimethyl,
rac-dimethylsilyl bis(2,3-dimethylindenyl)hafnium dimethyl, and
rac-dimethylsilyl bis(2,3-diethylindenyl)hafnium dimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the metallocene compound is rac-dimethylsilyl bis(2-methyl,3-propylindenyl)hafniumdimethyl (V-I), rac-dimethylsilyl bis(2-methyl,3-propylindenyl)zirconiumdimethyl (V-II), represented by the formulae below:

Formula VI (iii)

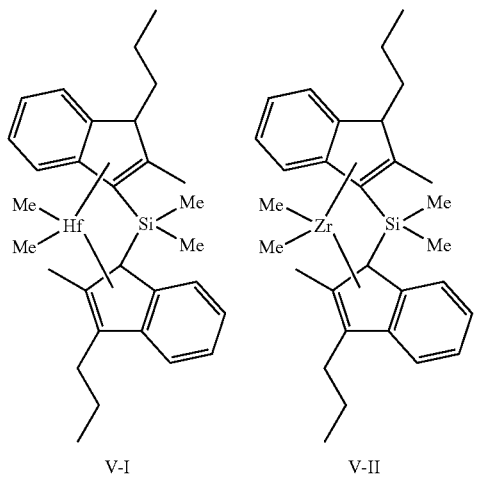

V-I        V-II

In some embodiments, the metallocene may be represented by Formula VI, below.

FORMULA VI

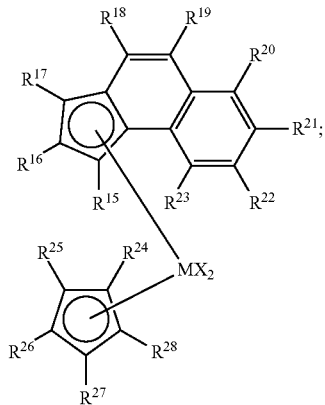

wherein M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^{15}$ and $R^{17}$ are, independently, a $C_1$ to $C_8$ alkyl group; preferably a $C_1$ to $C_8$ linear alkyl group, preferably methyl ethyl, propyl, butyl, pentyl, hexyl, heptyl or octyl, $R^{15}$ may be the same or different as $R^{17}$, and preferably are both methyl; and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen or a substituted or unsubstituted hydrocarbyl group having from 1 to 8 carbon atoms; preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three of $R^{24}$-$R^{28}$ groups are not hydrogen (alternately four of $R^{24}$-$R^{28}$ groups are not hydrogen, alternately five of $R^{24}$-$R^{28}$ groups are not hydrogen); 1) preferably all five groups of $R^{24}$-$R^{28}$ are methyl, or 2) four of the $R^{24}$-$R^{28}$ groups are not hydrogen and at least one of the $R^{24}$-$R^{28}$ groups is a $C_2$ to $C_8$ substituted or unsubstituted hydrocarbyl (preferably at least two, three, four or five of $R^{24}$-$R^{28}$ groups are a $C_2$ to $C_8$ substituted or unsubstituted hydrocarbyl).

In one embodiment, $R^{15}$ and $R^{17}$ are methyl groups, $R^{16}$ is a hydrogen, $R^{18}$-$R^{23}$ are all hydrogens, $R^{24}$-$R^{28}$ are all methyl groups, and each X is a methyl group.

Catalyst compounds that are particularly useful in this invention include $(CpMe_5)(1,3-Me_2-benz[e]indenyl)HfMe_2$, $(CpMe_5)(1-methyl-3-n-propylbenz[e]indenyl)HfMe_2$, $(CpMe_5)(1-n-propyl,3-methylbenz[e]indenyl)HfMe_2$, $(CpMe_5)(1-methyl-3-n-butylbenz[e]indenyl)HfMe_2$, $(CpMe_5)(1-n-butyl,3-methylbenz[e]indenyl)HfMe_2$, $(CpMe_5)(1-ethyl,3-methylbenz[e]indenyl)HfMe_2$, $(CpMe_5)(1-methyl,3-ethylbenz[e]indenyl)HfMe_2$, $(CpMe_4n-propyl)(1,3-Me_2-benz[e]indenyl)HfMe_2$, $(CpMe_4-n-propyl)(1-methyl-3-n-propylbenz[e]indenyl)HfMe_2$, $(CpMe_4-n-propyl)(1-n-propyl,3-methylbenz[e]indenyl)HfMe_2$, $(CpMe_4-n-propyl)(1-methyl-3-n-butylbenz[e]indenyl)HfMe_2$, $(CpMe_4-n-propyl)(1-n-butyl,3-methylbenz[e]indenyl)HfMe_2$, $(CpMe_4-n-propyl)(1-ethyl,3-methylbenz[e]indenyl)HfMe_2$, $(CpMe_4-n-propyl)(1-methyl,3-ethylbenz[e]indenyl)HfMe_2$, $(CpMe_4n-butyl)(1,3-Me_2-benz[e]indenyl)HfMe_2$, $(CpMe_4n-butyl)(1-methyl-3-n-propylbenz[e]indenyl)HfMe_2$, $(CpMe_4n-butyl)(1-n-propyl,3-methylbenz[e]indenyl)HfMe_2$, $(CpMe_4n-butyl)(1-methyl-3-n-butylbenz[e]indenyl)HfMe_2$, $(CpMe_4n-butyl)(1-n-butyl,3-methylbenz[e]indenyl)HfMe_2$, $(CpMe_4n-butyl)(1-ethyl,3-methylbenz[e]indenyl)HfMe_2$, $(CpMe_4n-butyl)(1-methyl,3-ethylbenz[e]indenyl)HfMe_2$, and the zirconium analogs thereof.

In an alternate embodiment, the "dimethyl" ($Me_2$) after the transition metal in the list of catalyst compounds above is replaced with a dihalide (such as dichloride or difluoride) or a bisphenoxide, particularly for use with an alumoxane activator.

(b) Activator Component of Catalyst System

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1, or alternately from 1:1 to 50:1.

In an alternate embodiment, little or no alumoxane is used in the process to produce the VT-HO copolymers. Preferably, alumoxane is present at zero mol %, alternately the alumoxane is present at a molar ratio of aluminum to transition metal less than 500:1, preferably less than 300:1, preferably less than 100:1, preferably less than 1:1. In an alternate embodiment, if an alumoxane is used to produce the VT-HO copolymers then, the alumoxane has been treated to remove free alkyl aluminum compounds, particularly trimethyl aluminum. Further, in a preferred embodiment, the activator used herein to produce the VT-HO copolymers is bulky as defined herein and is discrete.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

Ionizing Activators

It is within the scope of this invention to use an ionizing or stoichiometric activator, neutral or ionic, such as tri(n-butyl) ammonium tetrakis(pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. Preferred activators are the ionic activators.

Examples of neutral stoichiometric activators include tri-substituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as ([B$(C_6F_5)_3$ (X)]$^-$), which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines and the like. Two classes of compatible non-coordinating anions have been disclosed in European publications EP 0 277 003 A and EP 0 277 004 A, published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \quad (14)$$

wherein L is a neutral Lewis base; H is hydrogen; $(L-H)^+$ is a Bronsted acid; $A^{d-}$ is a non-coordinating anion having the charge d−; and d is 1 2, or 3.

The cation component, $(L-H)_d^+$ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene, and mixtures thereof.

The anion component $A^{d-}$ include those having the formula $[M^{k+}Q_n]^{d-}$ wherein k is 1, 2, or 3; n is 2, 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the catalyst system of the processes of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts such as: di-(1-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $(L-H)_d^+$ $(A^{d-})$ is, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, an activation method using ionizing ionic compounds not containing an active proton but capable of producing a bulky ligand metallocene catalyst cation and their non-coordinating anion are also contemplated, and are described in European publications EP 0 426 637 A, EP 0 573 403 A, and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-cordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. In addition to these activator compounds or co-catalysts, scavengers are used such as tri-isobutyl aluminum or tri-octyl aluminum.

Inventive processes also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see European publications EP 0 427 697 A and EP 0 520 732 A for illustrations of analogous Group-4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Another suitable ion forming, activating cocatalyst comprises a salt of a cationic oxidizing agent and a noncoordinating, compatible anion represented by the formula:

$$(OX^{e+})_d(A^{d-})_e \quad (16)$$

wherein $OX^{e+}$ is a cationic oxidizing agent having a charge of e+; e is 1, 2 or 3; and $A^{d-}$ is a non-coordinating anion having the charge d−; and d is 1, 2 or 3. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

The typical NCA (or non-alumoxane activator) activator-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Bulky Activators

"Bulky activator" as used herein refers to anionic activators represented by the formula:

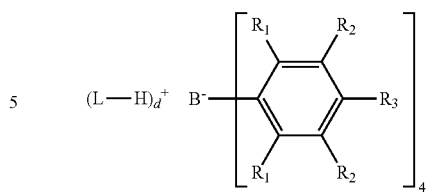

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
|---|---|---|---|---|---|
| Dimethylanilinium tetrakis(perfluoronaphthyl)borate | [perfluoronaphthyl]$_4$ | $C_{10}F_7$ | 34 | 261 | 1044 |
| Dimethylanilinium tetrakis(perfluorobiphenyl)borate | [perfluorobiphenyl]$_4$ | $C_{12}F_9$ | 42 | 349 | 1396 |
| [4-tButyl-PhNMe$_2$H][(C$_6$F$_3$(C$_6$F$_5$)$_2$)$_4$B] | [C$_6$F$_3$(C$_6$F$_5$)$_2$]$_4$ | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Activator Combinations

It is within the scope of this invention that catalyst compounds can be combined with one or more activators or activation methods described above. For example, a combination of activators have been described in U.S. Pat. Nos. 5,153,157; 5,453,410; European publication EP 0 573 120 B1; PCT publications WO 94/07928; and WO 95/14044. These documents all discuss the use of an alumoxane in combination with an ionizing activator.

(iii) Optional Co-Activators and Scavengers

In addition to these activator compounds, scavengers or co-activators may be used. Aluminum alkyl or organoaluminum compounds which may be utilized as co-activators (or scavengers) include, for example, trimethylaluminum, triethylaluminum, triisobutylaluminum, tri-n-hexylaluminum, and tri-n-octylaluminum.

(iv) Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g, and average particle size of from about 10 to about 200 μm. Most preferably, the surface area of the support material is in the range is from about 100 to about 400 $m^2/g$, pore volume from about 0.8 to about 3.0 cc/g, and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$), examples of which are marketed under the tradenames of DAVISON 952 or DAVISON 955 by the Davison Chemical Division of W.R. Grace and Company. In other embodiments DAVIDSON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. The slurry of the support material in the solvent is prepared by introducing the support material into the solvent, and heating the mixture to about 0° C. to about 70° C., preferably to about 25° C. to about 60° C., preferably at room temperature. Contact times typically range from about 0.5 hours to about 24 hours, from about 0.5 hours to about 8 hours, or from about 0.5 hours to about 4 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1H$ NMR. For example, for the silica support material heated at about 600° C., the amount of the activator added to the slurry is such that the molar ratio of B to the hydroxyl groups (OH) on the silica is about 0.5:1 to about 4:1, preferably about 0.8:1 to about 3:1, more preferably about 0.9:1 to about 2:1 and most preferably about 1:1. The amount of B on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

In another embodiment this invention relates to:
1. A higher olefin copolymer having an Mn of 300 g/mol or more (measured by $^1H$ NMR), preferably 300 to 60,000 g/mol preferably 400 to 50,000 g/mol, preferably 500 to 35,000 g/mol, preferably 300 to 15,000 g/mol, preferably 400 to 12,000 g/mol, or preferably 750 to 10,000 g/mol, comprising:
(i) from about 20 to about 99.9 mol % of at least one $C_5$ to $C_{40}$ higher olefin, from about 25 to about 90 mol %, from about 30 to about 85 mol %, from about 35 to about 80 mol %, from about 40 to about 75 mol %, or from about 50 to about 95 mol % of at least one $C_5$ to $C_{40}$ higher olefin, preferably two or more $C_5$ to $C_{40}$ higher olefins (preferably selected from pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); and (ii) from about 0.1 to about 80 mol % of propylene, from about 5 mol % to about 70 mol %, from about 10 to about 65 mol %, from about 15 to about 55 mol %, from about 25 to about 50 mol %, or from about 30 to about 80 mol %;

wherein the higher olefin copolymer has at least 40% allyl chain ends, at least 50% allyl chain ends, at least 60% allyl chain ends, at least 70% allyl chain ends, or at least 80% allyl chain ends, at least 90% allyl chain ends, at least 95% allyl chain ends;

in some embodiments, an isobutyl chain end to allyl chain end ratio of less than 0.70:1, less than 0.65:1, less than 0.60:1, less than 0.50:1, or less than 0.25:1, and in other embodiments, an allyl chain end to vinylidene group ratio of more than 2:1, more than 2.5:1, more than 3:1, more than 5:1, or more than 10:1.

2. The higher olefin copolymer of paragraph 1, wherein the higher olefin copolymer comprises at least 50 wt %, based upon the weight of the copolymer composition, of olefins having at least 36 carbon atoms, as measured by $^1$H NMR, assuming one unsaturation per chain.

3. The higher olefin copolymer of paragraphs 1 and 2, wherein the higher olefin copolymer comprises less than 20 wt % dimer and trimer, preferably less than 10 wt %, preferably less than 5 wt %, or more preferably less than 2 wt %, based upon the weight of the copolymer composition.

4. The higher olefin copolymer of paragraphs 1 to 3, wherein the higher olefin copolymer has a viscosity at 60° C. of greater than 1,000 cP, greater than 12,000 cP, or greater than 100,000 cP (alternatively less than 200,000 cP, less than 150,000 cP, or less than 100,000 cP).

5. A higher olefin copolymer having an Mn of 300 g/mol or more (measured by $^1$H NMR), preferably 300 to 60,000 g/mol and comprising: (i) from about 80 to about 99.9 mol % of at least one $C_4$ olefin, preferably about 85 to about 99.9 mol %, more preferably about 90 to about 99.9 mol %; and (ii) from about 0.1 to about 20 mol % of propylene, preferably about 0.1 to about 15 mol %, more preferably about 0.1 to about 10 mol %; wherein the higher olefin copolymer has at least 40% allyl chain ends, preferably at least 50% allyl chain ends, at least 60% allyl chain ends, at least 70% allyl chain ends, or at least 80% allyl chain ends, at least 90% allyl chain ends, at least 95% allyl chain ends; and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1.

6. A process for making the higher olefin copolymers of paragraphs 1 to 4, wherein the process comprises contacting:

(i) from about 20 to about 99.9 mol % of at least one $C_5$ to $C_{40}$ higher olefin, (preferably from about 25 to about 90 mol %, from about 30 to about 85 mol %, from about 35 to about 80 mol %, from about 40 to about 75 mol %, or from about 50 to about 95 mol %); preferably two or more $C_5$ to $C_{40}$ higher olefins (preferably selected from butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); and (ii) from about 0.1 to about 80 mol % of propylene, (preferably from about 5 mol % to about 70 mol %, from about 10 to about 65 mol %, from about 15 to about 55 mol %, from about 25 to about 50 mol %, or from about 30 to about 80 mol %); and (iii) optionally, ethylene;

wherein the contacting occurs in the presence of a catalyst system comprising an activator and at least one metallocene compound represented by at least one of the formulae:

FORMULA I

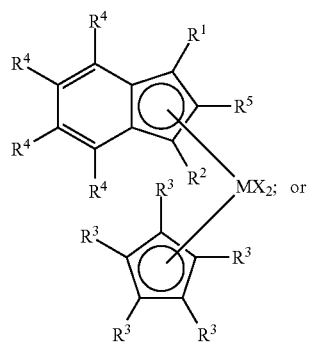

FORMULA II

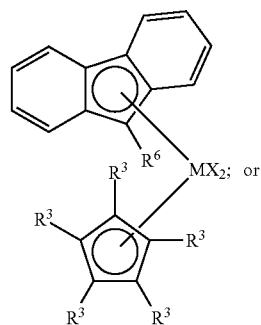

FORMULA III

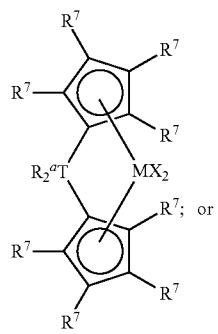

FORMULA IV

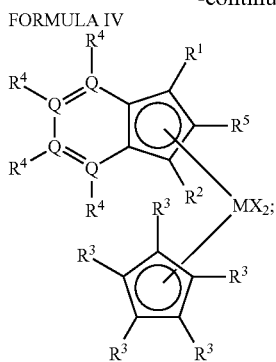

(iv)

where:

M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system);

each Q is, independently carbon or a heteroatom;

each $R^1$ is, independently, a $C_1$ to $C_8$ alkyl group, $R^1$ may the same or different as $R^2$;

each $R^2$ is, independently, a $C_1$ to $C_8$ alkyl group;

each $R^3$ is, independently, hydrogen, or a substituted or unsubstituted hydrocarbyl group having from 1 to 8 carbon atoms, provided however that at least three $R^3$ groups are not hydrogen;

each $R^4$ is, independently, hydrogen or a substituted or unsubstituted hydrocarbyl group, a heteroatom or heteroatom containing group;

$R^5$ is hydrogen or a $C_1$ to $C_8$ alkyl group;

$R^6$ is hydrogen or a $C_1$ to $C_8$ alkyl group;

each $R^7$ is, independently, hydrogen or a $C_1$ to $C_8$ alkyl group, provided however that at least seven $R^7$ groups are not hydrogen;

$R_2^a T$ is a bridging group, where T is a group 14 element (preferably C, Si, or Ge);

each $R^a$ is, independently, hydrogen, halogen or a $C_1$ to $C_{20}$ hydrocarbyl; and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated;

FORMULA V

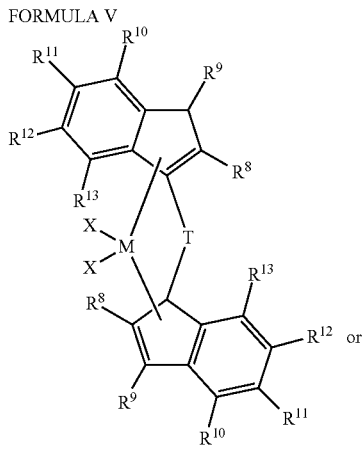

(v)

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R^8$ is, independently, a $C_1$ to $C_{10}$ alkyl group;

each $R^9$ is, independently, a $C_1$ to $C_{10}$ alkyl group;

each $R^{10}$ is hydrogen;

each $R^{11}$, $R^{12}$, and $R^{13}$, is, independently, hydrogen or a substituted or unsubstituted hydrocarbyl group, a heteroatom or heteroatom containing group;

T is a bridging group, preferably represented by the formula $R_2^a J$, where J is a group 14 element (preferably C, Si, or Ge);

each $R^a$ is, independently, hydrogen, halogen or a $C_1$ to $C_{20}$ hydrocarbyl;

two $R^a$ can form a cyclic structure including aromatic, partially saturated or saturated cyclic or fused ring system; and further provided that any two adjacent R groups may form a fused ring or multicenter fused ring system where the rings may be aromatic, partially saturated or saturated; and further provided that any of adjacent $R^{11}$, $R^{12}$, and $R^{13}$ groups may form a fused ring or multicenter fused ring system where the rings may be aromatic, partially saturated or saturated;

FORMULA VI

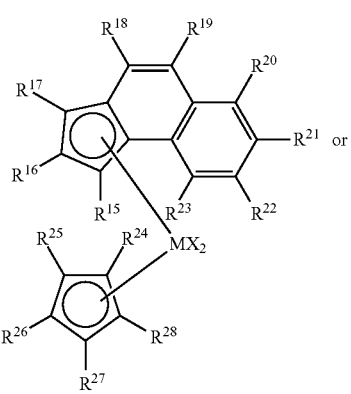

(vi)

wherein

M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^{15}$ and $R^{17}$ are, independently, a $C_1$ to $C_8$ alkyl group; and each $R^{16}, R^{18}, R^{19}, R^{20}, R^{21}, R^{22}, R^{23}, R^{24}, R^{25}, R^{26}, R^{27}$, and $R^{28}$ are, independently, hydrogen or a substituted or unsubstituted hydrocarbyl group having from 1 to 8 carbon atoms, wherein the $C_5$ to $C_{40}$ higher olefin is selected from butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof 7. A process for making the higher olefin copolymers of paragraphs 1 to 4, wherein the process comprises contacting:

(i) from about 80 to about 99.9 mol % of at least one $C_4$ olefin, preferably about 85 to about 99.9 mol %, more preferably about 90 to about 99.9 mol % (preferably a mixed butene stream comprising 1-butene is used);

(ii) from about 0.1 to about 20 mol % of propylene, preferably about 0.1 to about 15 mol %, more preferably about 0.1 to about 10 mol %;

(iii) optionally, ethylene;

wherein the contacting occurs in the presence of a catalyst system comprising an activator and at least one metallocene compound represented by at least one of the formulae:

FORMULA I

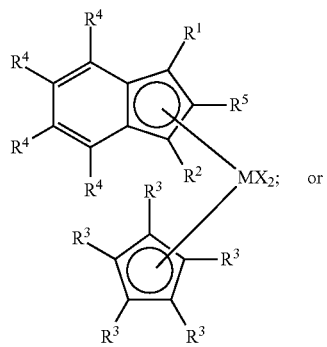

(i)

FORMULA II

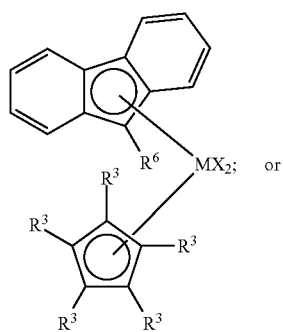

(ii)

FORMULA III

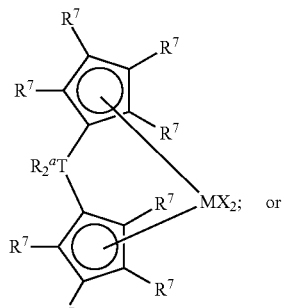

(iii)

FORMULA IV

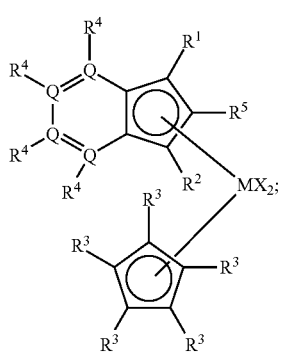

(iv)

where:

M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, and a combination thereof, (two X's may form a part of a fused ring or a ring system);

each Q is, independently carbon or a heteroatom;

each $R^1$ is, independently, a $C_1$ to $C_8$ alkyl group, $R^1$ may the same or different as $R^2$;

each $R^2$ is, independently, a $C_1$ to $C_8$ alkyl group;

each $R^3$ is, independently, hydrogen or a substituted or unsubstituted hydrocarbyl group having from 1 to 8 carbon atoms, provided however that at least three $R^3$ groups are not hydrogen;

each $R^4$ is, independently, hydrogen or a substituted or unsubstituted hydrocarbyl group, a heteroatom or heteroatom containing group;

$R^5$ is hydrogen or a $C_1$ to $C_8$ alkyl group;

$R^6$ is hydrogen or a $C_1$ to $C_8$ alkyl group;

each $R^7$ is, independently, hydrogen or a $C_1$ to $C_8$ alkyl group, provided however that at least seven $R^7$ groups are not hydrogen;

$R_2^aT$ is a bridging group, where T is a group 14 atom, preferably C, Si, or Ge;

each $R^a$ is, independently, hydrogen, halogen or a $C_1$ to $C_{20}$ hydrocarbyl; and two $R^a$ can form a cyclic structure including aromatic, partially saturated or saturated cyclic or fused ring system; and further provided that any two adjacent R groups may form a fused ring or multicenter fused ring system where the rings may be aromatic, partially saturated or saturated;

FORMULA V

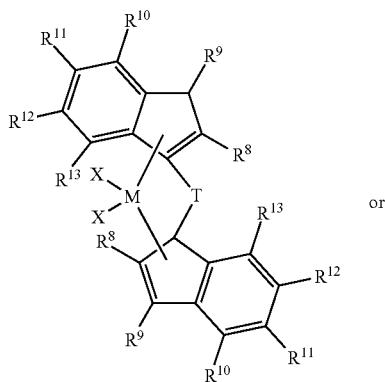

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^8$ is, independently, a $C_1$ to $C_{10}$ alkyl group;
each $R^9$ is, independently, a $C_1$ to $C_{10}$ alkyl group;
each $R^{10}$ is hydrogen;
each $R^{11}$, $R^{12}$, and $R^{13}$, is, independently, hydrogen or a substituted or unsubstituted hydrocarbyl group, a heteroatom or heteroatom containing group;
T is a bridging group, preferably represented by the formula $R_2^aJ$, where J is a group 14 element (preferably C, Si, or Ge);
each $R^a$ is, independently, hydrogen, halogen or a $C_1$ to $C_{20}$ hydrocarbyl;
two $R^a$ can form a cyclic structure including aromatic, partially saturated, or saturated cyclic or fused ring system;
and further provided that any two adjacent R groups may form a fused ring or multicenter fused ring system where the rings may be aromatic, partially saturated or saturated;
further provided that any of adjacent $R^{11}$, $R^{12}$, and $R^{13}$ groups may form a fused ring or multicenter fused ring system where the rings may be aromatic, partially saturated or saturated;

FORMULA VI

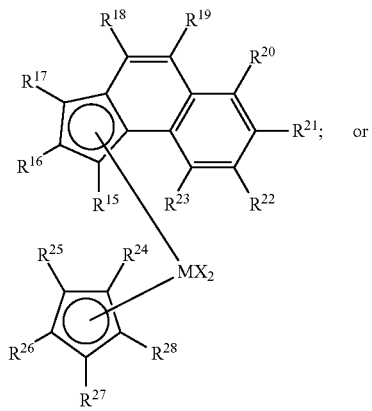

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^{15}$ and $R^{17}$ are, independently, a $C_1$ to $C_8$ alkyl group; and
each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen or a substituted or unsubstituted hydrocarbyl group having from 1 to 8 carbon atoms.

8. The processes of paragraph 6 or 7, wherein the activator is a bulky activator represented by the formula:

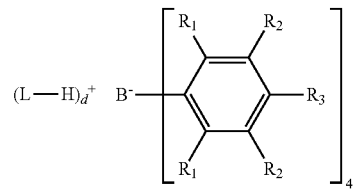

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group, preferably a fluoride or a $C_6$ perfluorinated aromatic hydrocarbyl group;
each $R_3$ is a halide, $C_6$ to $C_{20}$ substituted aromatic hydrocarbyl group, or a siloxy group of the formula —O—Si—$R_a$, where $R_a$ is a $C_1$ to $C_{20}$ hydrocarbyl or hydrocarbylsilyl group, preferably a fluoride or a $C_6$ perfluorinated aromatic hydrocarbyl group;
wherein L is a neutral Lewis base;
H is hydrogen;
$(L-H)^+$ is a Bronsted acid;
d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

9. The process of paragraph 6 or 7, wherein the bulky activator is at least one of: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri (t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, [4-t-butyl-PhNMe$_2$H][(C$_6$F$_3$ (C$_6$F$_5$)$_2$)$_4$B] (where Ph is phenyl and Me is methyl).

10. A composition comprising the higher olefin copolymers of paragraphs 1 to 5 or made by the process of paragraphs 6 to 9, preferably the composition is a lubricant blend.

11. The use of the composition of paragraph 10 as a lubricant.

EXAMPLES

Product Characterization

Products were characterized by $^1$H NMR, GPC, and $^{13}$C NMR as follows.

GPC

Mn, Mw, and Mz were measured by using a High Temperature Size Exclusion Chromatograph (SEC, either from Waters Corporation or Polymer Laboratories), equipped with a differential refractive index detector (DRI). Experimental details, described in: T. Sun, P. Brant, R. R. Chance, and W. W. Graessley, Macromolecules, Volume 34, Number 19, pp. 6812-6820, (2001) and references therein, were used. Three Polymer Laboratories PLgel 10 mm Mixed-B columns were used. The nominal flow rate was 0.5 cm$^3$/min, and the nominal injection volume was 300 µL. The various transfer lines, columns and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 µm glass prefilter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto, (dn/dc)=0.104 for propylene polymers and 0.1 otherwise. Units of parameters used throughout this description of the SEC method are: concentration was expressed in g/cm$^3$, molecular weight was expressed in g/mol, and intrinsic viscosity was expressed in dL/g.

$^{13}$C NMR $^{13}$C NMR data was collected at 120° C. at a $^{13}$C frequency of 100 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-d$_2$ at concentrations between 10 wt % to 15 wt % prior to being inserted into the spectrometer magnet.

Prior to data analysis spectra were referenced by setting the chemical shift of the TCE solvent signal to 74.39 ppm.

Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
| --- | --- |
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

$^1$H NMR $^1$H NMR data was collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 mHz was used). Data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn was calculated by dividing the total number of unsaturated species into 14,000, and has units of g/mol.

The chemical shift regions for the olefin types are defined to be between the following spectral regions.

| Unsaturation Type | Region (ppm) | Number of hydrogens per structure |
| --- | --- | --- |
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Viscosity

Viscosity was measured using a Brookfield Digital Viscometer.

Metallocenes Used in Examples

The following metallocenes were used in the examples below.

| Metallocene | Structure |
|---|---|
| A (Comparative) | |
| B (Comparative) | |
| C (Comparative) | |
| D | |
| E | |
| F | |
| G | 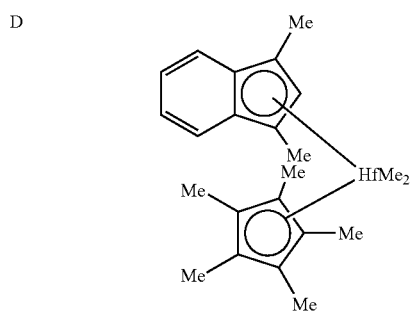 |

Activators Used

The following activators were used in the examples below.

| Activator | Chemical Name |
|---|---|
| I | Dimethylaniliniumtetrakis(pentafluorophenyl)borate |
| II | Dimethylaniliniumtetrakis(perfluorobiphenyl)borate |
| III | Dimethylaniliniumtetrakis(perfluoronaphthyl)borate |

Polymerization Conditions for Examples 1-6

Polymerization grade propylene was used and further purified by passing it through a series of columns: 2250 cc Oxyclear cylinder from Labelear (Oakland, Calif.), followed by a 2250 cc column packed with dried 3 Å mole sieves purchased from Aldrich Chemical Company (St. Louis, Mich.), two 500 cc columns packed with dried 5 Å mole sieves purchased from Aldrich Chemical Company, one 500 cc column packed with ALCOA Selexsorb CD (7×14 mesh) purchased from Coastal Chemical Company (Abbeville, La.), and one 500 cc column packed with ALCOA Selexsorb COS (7×14 mesh) purchased from Coastal Chemical Company.

Polymerization grade hexanes was further purified by passing it through a series of columns: two 500 cc Oxyclear cylinders from Labelear followed by two 500 cc columns packed with dried 3 Å mole sieves purchased from Aldrich Chemical Company, and two 500 cc columns packed with dried 5 Å mole sieves purchased from Aldrich Chemical Company, and used.

Scavengers and Co-catalysts

Triisobutyl aluminum (TIBAL) was obtained from Akzo Chemicals, Inc. (Chicago, Ill.) and used without further purification. Tri n-octyl aluminum (TNOAL) was obtained from Akzo Chemicals, Inc. and used without further purification.

Reactor Description and Preparation

Polymerizations were conducted in an inert atmosphere ($N_2$) drybox using 48 Cell Parallel Pressure Reactors (PPR) equipped with external heaters for temperature control, glass inserts (internal volume of reactor=22.5 mL), septum inlets, regulated supply of nitrogen, propylene, and equipped with disposable PEEK (PolyEtherEtherKetone) mechanical stirrers (800 RPM). The PPRs were prepared for polymerization by purging with dry nitrogen at 150° C. for 5 hours and then at 25° C. for 5 hours.

Example 1

Decene-Propylene, Hexene-Propylene, and Decene-Hexene-Propylene Polymerizations with Metallocenes E and F The reactor was prepared as described above, and then charged with 1-decene and/or 1-hexene. The reactors were heated to 25° C. and propylene was then charged to the reactor. A solution of scavenger/co-catalyst at process temperature and pressure was next added to the reactors via syringe. The reactors were heated to process temperature (85° C.) and stirred at 800 RPM.

Metallocene catalysts were mixed with the activator and stirred in toluene at ambient temperature and pressure and added to the reactors (at process temperature and pressure) via syringe as a solution to initiate polymerization. Because the solutions are added via syringe, a hexanes solution is also injected via the same syringe following their addition to insure that minimal solution is remaining in the syringe. This procedure is applied after the addition of the scavenger/co-catalyst solution as well as the catalyst solution.

Propylene was allowed to enter the reactors to a desired pressure through the use of regulators and allowed to drop during the polymerization. No pressure control was employed during the run. Reactor temperatures were monitored and typically maintained within a +/−1° C. temperature range. Polymerizations were quenched by the addition of approximately 50 psi (345 kPa) delta of Industrial Grade Air for approximately 60 seconds. The polymerizations were quenched after the desired polymerization time. The reactors were cooled and vented. The polymer was isolated after the remaining reaction components were removed in-vacuo. Yields reported include total weight of polymer and residual catalyst. Yields are listed in Table 1A, below.

TABLE 1A

Polymerization to Produce Copolymers and Terpolymers of Propylene and Decene and/or Hexene
Temperature = 85° C.; Reaction Time = 60 min;
[Metallocene] = [activator] = $1.6 \times 10^{-5}$ M

| Run | Metallocene | Activator | [$C_3$] | [$C_6$] | [$C_{10}$] | Yield, mg |
|---|---|---|---|---|---|---|
| A1 | E | III | 1.91 | 3.33 | 0 | 970.4 |
| A2 | E | III | 1.53 | 3.33 | 0 | 800.4 |
| A3 | E | III | 1.15 | 3.33 | 0 | 510.8 |
| A4 | E | III | 0.77 | 3.33 | 0 | 332.5 |
| A5 | E | III | 0.38 | 3.33 | 0 | 296.1 |
| A6 | E | III | 0 | 3.33 | 0 | 146.5 |
| B1 | E | III | 1.91 | 1.66 | 1.06 | 1092.7 |
| B2 | E | III | 1.53 | 1.66 | 1.06 | 708.4 |
| B3 | E | III | 1.15 | 1.66 | 1.06 | 520.9 |
| B4 | E | III | 0.77 | 1.66 | 1.06 | 523 |
| B5 | E | III | 0.38 | 1.66 | 1.06 | 422.2 |
| B6 | E | III | ca 0 | 1.66 | 1.06 | 273.5 |
| C1 | E | III | 1.91 | 3.33 | 0 | 872.9 |
| C2 | E | III | 1.53 | 3.33 | 0 | 681.6 |
| C3 | E | III | 1.15 | 3.33 | 0 | 616 |
| C4 | E | III | 0.77 | 3.33 | 0 | 388.7 |
| C5 | E | III | 0.38 | 3.33 | 0 | 334.7 |
| C6 | E | III | 0 | 3.33 | 0 | 240.8 |
| D1 | E | III | 1.91 | 1.66 | 1.06 | 1049.7 |
| D2 | E | III | 1.53 | 1.66 | 1.06 | 773.4 |
| D3 | E | III | 1.15 | 1.66 | 1.06 | 578 |
| D4 | E | III | 0.77 | 1.66 | 1.06 | 449.2 |
| D5 | E | III | 0.38 | 1.66 | 1.06 | 426.2 |
| D6 | E | III | 0 | 1.66 | 1.06 | 305.7 |
| E1 | F | II | 1.91 | 3.33 | 0 | 676.6 |
| E2 | F | II | 1.53 | 3.33 | 0 | 395.9 |
| E3 | F | II | 1.15 | 3.33 | 0 | 355.4 |
| E4 | F | II | 0.77 | 3.33 | 0 | 192.5 |
| E5 | F | II | 0.38 | 3.33 | 0 | 135.1 |
| E6 | F | II | 0 | 3.33 | 0 | 50.7 |
| F1 | F | II | 1.91 | 1.66 | 1.06 | 837.9 |
| F2 | F | II | 1.53 | 1.66 | 1.06 | 498.3 |
| F3 | F | II | 1.15 | 1.66 | 1.06 | 417.2 |
| F4 | F | II | 0.77 | 1.66 | 1.06 | 309.6 |
| F5 | F | II | 0.38 | 1.66 | 1.06 | 200.8 |
| F6 | F | II | 0 | 1.66 | 1.06 | 76.8 |
| G1 | F | II | 1.91 | 3.33 | 0 | 634.7 |
| G2 | F | II | 1.53 | 3.33 | 0 | 326.4 |
| G3 | F | II | 1.15 | 3.33 | 0 | 307.7 |
| G4 | F | II | 0.77 | 3.33 | 0 | 211.5 |
| G5 | F | II | 0.38 | 3.33 | 0 | 140.2 |
| G6 | F | II | 0 | 3.33 | 0 | 15.9 |
| H1 | F | II | 1.91 | 1.66 | 1.06 | 729.4 |
| H2 | F | II | 1.53 | 1.66 | 1.06 | 534.4 |
| H3 | F | II | 1.15 | 1.66 | 1.06 | 459.7 |
| H4 | F | II | 0.77 | 1.66 | 1.06 | 238 |
| H5 | F | II | 0.38 | 1.66 | 1.06 | 174.3 |
| H6 | F | II | 0 | 1.66 | 1.06 | 88 |

Data from the analysis of some of the cell products is shown in the Table 2B, below.

TABLE 1B

Characterization Data for Copolymers and Terpolymers Of Propylene and Decene and/or Hexene

| Run | mol % vinyls | mol % vinylidene | mol % Others | Mn ($^1$HNMR) | mol % $C_6$ and/or $C_{10}$* |
|---|---|---|---|---|---|
| A1 | 92.3 | 6.3 | 1.4 | 1737 | 47.9 |
| A2 | 87.5 | 8.6 | 3.9 | 1664 | 55.4 |
| A5 | 75.4 | 15.9 | 8.7 | 1980 | 84.7 |
| B1 | 89.1 | 8.2 | 2.7 | 1614 | 49.0* |
| B3 | 85.7 | 10.2 | 4.1 | 2206 | 64.5* |
| B6 | 61.9 | 26.2 | 11.9 | 3744 | 97.4* |
| E1 | 75.4 | 19.9 | 4.7 | 2091 | 41.5 |
| E4 | 57.5 | 29.4 | 13.1 | 2744 | 72.5 |

TABLE 1B-continued

Characterization Data for Copolymers and Terpolymers Of Propylene and Decene and/or Hexene

| Run | mol % vinyls | mol % vinylidene | mol % Others | Mn ($^1$HNMR) | mol % $C_6$ and/or $C_{10}$* |
|---|---|---|---|---|---|
| F1 | 73.7 | 21.4 | 4.9 | 2067 | 44* |
| F3 | 68 | 25.2 | 6.8 | 2603 | 52.8* |

KEY:
*Methyls from hexene and decene not resolved enough in $^1$H NMR to quantify separately. This value is the sum of both.

Runs A1, A2, and A5 are copolymerizations of propylene and hexene, using metallocene E and activator III. Runs E1 and E4 are copolymerizations of propylene and hexene, using metallocene F and activator II. The inventors observed that with increasing propylene content there was a concurrent increase in % vinyls. Also, with decreasing propylene feed, there was an observed increase in Mn, presumably through incorporation of more of the higher molecular weight hexene.

Runs B1, B3, and B6 are terpolymerizations of propylene, hexene, and decene, using metallocene E and activator III. Runs F1 and F3 are terpolymerizations of propylene, hexene, and decene, using metallocene F and activator II. It was similarly observed that with increasing propylene content, there was a concurrent increase in % vinyls. Also, with decreasing propylene feed, there was an observed increase in Mn, presumably through incorporation of more of the higher molecular weight hexene and decene.

Example 2

Octene-propylene Copolymerizations with Metallocenes E and G

Solution runs were performed as follows: propylene was first added to the reaction cell, then octene and isohexane was added such that the total solution volume was 5.0 mL. TNOAL was used as scavenger at a concentration of 1 M. A solution of activator III in toluene was added first followed by a solution of the metallocene E or F such that the activator to metallocene ratio was 1:1. The cells were heated to 85° C. and the reaction proceeded for 1 hour. The reaction was quenched with air and unreacted monomers were removed in vacuo. Analysis of some of the cell products are listed in Table 2B.

TABLE 2A

Octene-Propylene Copolymerizations.
Run time = 60 minutes; Activator to metallocene ratio = 1:1;
Reaction temperature = 85° C.; TNOAL = 1.2 × 10−4 mol/L.

| Run | Metallocene | Activator | [$C_3$] mol/L | [$C_8$] mol/L | [metallocene], mol/L | Yield, mg |
|---|---|---|---|---|---|---|
| A1 | E | III | 1.91 | 1.28 | 8.0 × 10−6 | 486 |
| A2 | E | III | 1.91 | 1.66 | 8.0 × 10−6 | 629 |
| A3 | E | III | 1.2 | 2.04 | 8.0 × 10−6 | 401 |
| A4 | E | III | 1.2 | 2.43 | 8.0 × 10−6 | 579 |
| A5 | E | III | 0.48 | 2.81 | 8.0 × 10−6 | 525 |
| A6 | E | III | 0.48 | 3.19 | 8.0 × 10−6 | 388 |
| B1 | E | III | 1.91 | 1.28 | 8.0 × 10−6 | 506 |
| B2 | E | III | 1.91 | 1.66 | 8.0 × 10−6 | 648 |
| B3 | E | III | 1.2 | 2.04 | 8.0 × 10−6 | 577 |
| B4 | E | III | 1.2 | 2.43 | 8.0 × 10−6 | 674 |
| B5 | E | III | 0.48 | 2.81 | 8.0 × 10−6 | 530 |
| B6 | E | III | 0.48 | 3.19 | 8.0 × 10−6 | 561 |
| C1 | G | III | 1.91 | 1.28 | 8.0 × 10−6 | 378 |
| C2 | G | III | 1.91 | 1.66 | 8.0 × 10−6 | 443 |
| C3 | G | III | 1.2 | 2.04 | 8.0 × 10−6 | 443 |
| C4 | G | III | 1.2 | 2.43 | 8.0 × 10−6 | 603 |
| C5 | G | III | 0.48 | 2.81 | 8.0 × 10−6 | 638 |
| C6 | G | III | 0.48 | 3.19 | 8.0 × 10−6 | 597 |
| D1 | G | III | 1.91 | 1.28 | 8.0 × 10−6 | 380 |
| D2 | G | III | 1.91 | 1.66 | 8.0 × 10−6 | 522 |
| D3 | G | III | 1.2 | 2.04 | 8.0 × 10−6 | 470 |
| D4 | G | III | 1.2 | 2.43 | 8.0 × 10−6 | 503 |
| D5 | G | III | 0.48 | 2.81 | 8.0 × 10−6 | 625 |
| D6 | G | III | 0.48 | 3.19 | 8.0 × 10−6 | 578 |
| E1 | E | III | 1.91 | 1.28 | 1.60 × 10−5 | 693 |
| E2 | E | III | 1.91 | 1.66 | 1.60 × 10−5 | 960 |
| E3 | E | III | 1.2 | 2.04 | 1.60 × 10−5 | 996 |
| E4 | E | III | 1.2 | 2.43 | 1.60 × 10−5 | 1,176 |
| E5 | E | III | 0.48 | 2.81 | 1.60 × 10−5 | 1,081 |
| E6 | E | III | 0.48 | 3.19 | 1.60 × 10−5 | 1,079 |
| F1 | E | III | 1.91 | 1.28 | 1.60 × 10−5 | 727 |
| F2 | E | III | 1.91 | 1.66 | 1.60 × 10−5 | 972 |
| F3 | E | III | 1.2 | 2.04 | 1.60 × 10−5 | 945 |
| F4 | E | III | 1.2 | 2.43 | 1.60 × 10−5 | 1,141 |
| F5 | E | III | 0.48 | 2.81 | 1.60 × 10−5 | 954 |
| F6 | E | III | 0.48 | 3.19 | 1.60 × 10−5 | 1,126 |
| G1 | F | III | 1.91 | 1.28 | 1.60 × 10−5 | 630 |
| G2 | G | III | 1.91 | 1.66 | 1.60 × 10−5 | 751 |
| G3 | G | III | 1.2 | 2.04 | 1.60 × 10−5 | 914 |
| G4 | G | III | 1.2 | 2.43 | 1.60 × 10−5 | 1,097 |
| G5 | G | III | 0.48 | 2.81 | 1.60 × 10−5 | 1,231 |
| G6 | G | III | 0.48 | 3.19 | 1.60 × 10−5 | 1,230 |
| H1 | G | III | 1.91 | 1.28 | 1.60 × 10−5 | 497 |
| H2 | G | III | 1.91 | 1.66 | 1.60 × 10−5 | 637 |
| H3 | G | III | 1.2 | 2.04 | 1.60 × 10−5 | 589 |
| H4 | G | III | 1.2 | 2.43 | 1.60 × 10−5 | 888 |
| H5 | G | III | 0.48 | 2.81 | 1.60 × 10−5 | 1,146 |
| H6 | G | III | 0.48 | 3.19 | 1.60 × 10−5 | 1,319 |

Data from the analysis of some of the cell products is shown in the Table 2B, below.

TABLE 2B

Data for $C_8/C_3$ copolymers.

| Run | mol % vinyls | mol % VYD | mol % Others | Mn by $^1$HNMR | mol % $C_8$ by $^1$H NMR | mol % $C_8$ by $^{13}$C NMR | GPC Mn | Mw/Mn | isobutyl to vinyl integration |
|---|---|---|---|---|---|---|---|---|---|
| A1 | 94.9 | 3.9 | 1.2 | 1,261 | 36.9 | 36.4 | 851 | 2.1 | 0.60 |
| B1 | 92.8 | 5.9 | 1.3 | 1,287 | 39 | — | 1151 | 1.7 | — |
| B3 | 91 | 6.9 | 2.1 | 1,769 | 53 | — | 1074 | 2.2 | — |
| B6 | 91 | 6.1 | 2.9 | 3,147 | 71 | — | 1601 | 2.2 | — |

TABLE 2B-continued

Data for $C_8/C_3$ copolymers.

| Run | mol % vinyls | mol % VYD | mol % Others | Mn by $^1$HNMR | mol % $C_8$ by $^1$H NMR | mol % $C_8$ by $^{13}$C NMR | GPC Mn | Mw/Mn | isobutyl to vinyl integration |
|---|---|---|---|---|---|---|---|---|---|
| C1 | 92 | 8 | 0 | 411 | 60 | 62.3 | 288 | 1.4 | 0.68 |
| C3 | 92 | 8 | 0 | 400 | 72 | — | — | — | — |
| C6 | 81 | 19 | 0 | 764 | 83 | — | — | — | — |

VYD = vinylidene

Example 3

Decene-Propylene Polymerization (Comparison of Metallocene E with Metallocene D)

Run time was 60 minutes; Activator to metallocene ratio=1:1; Reaction temperature was 85° C.; TNOAL=1.2× $10^{-4}$ mol/L.

TABLE 3A

Comparison of Metallocene E with Metallocene D

| Run | Metallocene | Activator | Concentration, mol/L [$C_3$] | [$C_{10}$] | Temperature, ° C. | Yield, mg |
|---|---|---|---|---|---|---|
| A1 | E | I | 0.057 | 2.33 | 85 | 474 |
| A2 | E | I | 0.057 | 2.33 | 85 | 602 |
| A3 | E | I | 0.057 | 2.33 | 95 | 507 |
| A4 | E | I | 0.057 | 2.33 | 95 | 506 |
| A5 | E | I | 0.057 | 2.33 | 105 | 523 |
| A6 | E | I | 0.057 | 2.33 | 104.9 | 545 |
| B1 | D | I | 0.057 | 2.33 | 85 | 148 |
| B2 | D | I | 0.057 | 2.33 | 84.9 | 209 |
| B3 | D | I | 0.057 | 2.33 | 95.1 | 142 |
| B4 | D | I | 0.057 | 2.33 | 95 | 106 |
| B5 | D | I | 0.057 | 2.33 | 104.9 | 101 |
| B6 | D | I | 0.057 | 2.33 | 105 | 76 |
| C1 | E | III | 0.057 | 2.33 | 85 | 303 |
| C2 | E | III | 0.057 | 2.33 | 85.1 | 329 |
| C3 | E | III | 0.057 | 2.33 | 95 | 316 |
| C4 | E | III | 0.057 | 2.33 | 95 | 233 |
| C5 | E | III | 0.057 | 2.33 | 105.2 | 259 |
| C6 | E | III | 0.057 | 2.33 | 105.1 | 191 |
| D1 | D | III | 0.057 | 2.33 | 85.1 | 174 |
| D2 | D | III | 0.057 | 2.33 | 85 | 239 |
| D3 | D | III | 0.057 | 2.33 | 95 | 88 |
| D4 | D | III | 0.057 | 2.33 | 95.1 | 53 |
| D5 | D | III | 0.057 | 2.33 | 105.1 | 24 |
| II | D | III | 0.057 | 2.33 | 105.1 | 21 |
| E1 | E | I | 0.96 | 2.33 | 85 | 1144 |
| E2 | E | I | 0.96 | 2.33 | 84.9 | 1252 |
| E3 | E | I | 0.96 | 2.33 | 95 | 1056 |
| E4 | E | I | 0.96 | 2.33 | 95 | 991 |
| E5 | E | I | 0.96 | 2.33 | 105.1 | 846 |
| E6 | E | I | 0.96 | 2.33 | 104.9 | 750 |
| F1 | D | I | 0.96 | 2.33 | 85 | 127 |
| F2 | D | I | 0.96 | 2.33 | 85.2 | 150 |
| F3 | D | I | 0.96 | 2.33 | 94.9 | 90 |
| F4 | D | I | 0.96 | 2.33 | 94.9 | 98 |
| F5 | D | I | 0.96 | 2.33 | 105 | 93 |
| F6 | D | I | 0.96 | 2.33 | 105.1 | 50 |
| G1 | E | III | 0.96 | 2.33 | 85 | 820 |
| G2 | E | III | 0.96 | 2.33 | 84.9 | 680 |
| G3 | E | III | 0.96 | 2.33 | 95 | 601 |
| G4 | E | III | 0.96 | 2.33 | 94.9 | 481 |
| G5 | E | III | 0.96 | 2.33 | 105 | 377 |
| G6 | E | III | 0.96 | 2.33 | 105.2 | 359 |
| H1 | D | III | 0.96 | 2.33 | 85 | 170 |
| H2 | D | III | 0.96 | 2.33 | 85 | 154 |
| H3 | D | III | 0.96 | 2.33 | 94.9 | 100 |
| H4 | D | III | 0.96 | 2.33 | 95.1 | 72 |
| H5 | D | III | 0.96 | 2.33 | 105.1 | 53 |
| H6 | D | III | 0.96 | 2.33 | 104.8 | 44 |

Data from the analysis of some of the cell products is shown in the Table 3B, below.

TABLE 3B

Data for Comparison of Metallocene E with Metallocene D

| Run | mol % vinyls | mol % vinylidenes | mol % Others | Mn by $^1$HNMR | mol % $C_8$ by $^1$H NMR | mol % $C_8$ by $^{13}$C NMR | isobutyl to vinyl integration |
|---|---|---|---|---|---|---|---|
| A1 | 52.9 | 41.2 | 5.9 | 2224 | 90.7 | — | — |
| A6 | 39.9 | 51 | 9.1 | 1309 | 98.5 | — | — |
| B1 | 60.3 | 38.2 | 1.5 | 1300 | 91.8 | — | — |
| B6 | 41.7 | 57.1 | 1.2 | 890 | 93.7 | — | — |
| G1 | 85.8 | 11.3 | 2.9 | 1800 | 66.7 | — | — |
| H1 | 87.9 | 11.5 | 0.6 | 690 | 69.2 | — | — |
| H2 | 89 | 10.7 | 0.3 | 682 | 77.5 | 78.9 | 28.2 |

Example 4

Decene-Propylene Polymerization (Comparison of Metallocene E with Comparative Metallocenes A, B, & C)

Non-inventive metallocenes A, B, and C were compared with Metallocene E of the present invention. Run time was 60 minutes; Activator to metallocene ratio=1:1; Reaction temperature was 85° C.; TNOAL=$1.2 \times 10^{-4}$ mol/L.

TABLE 4A

Comparison of Metallocene E with Comparative Metallocenes.

| Run | Metallocene | Activator | $[C_3]$, mol/L | $[C_{10}]$, mol/L | Yield, mg |
|---|---|---|---|---|---|
| A1 | E | III | 1.9 | 1.06 | 608 |
| A2 | E | III | 1.9 | 1.38 | 542 |
| A3 | E | III | 1.2 | 1.69 | 573 |
| A4 | E | III | 1.2 | 2.01 | 698 |
| A5 | E | III | 0.48 | 2.33 | 348 |
| A6 | E | III | 0.48 | 2.65 | 39 |
| B1 | B | III | 1.9 | 1.06 | 254 |
| B2 | B | III | 1.9 | 1.38 | 426 |
| B3 | B | III | 1.2 | 1.69 | 500 |
| B4 | B | III | 1.2 | 2.01 | 106 |
| B5 | B | III | 0.48 | 2.33 | 695 |
| B6 | B | III | 0.48 | 2.65 | 8 |
| C1 | A | III | 1.9 | 1.06 | 288 |
| C2 | A | III | 1.9 | 1.38 | 325 |
| C3 | A | III | 1.2 | 1.69 | 222 |
| C4 | A | III | 1.2 | 2.01 | 147 |
| C5 | A | III | 0.48 | 2.33 | 93 |
| C6 | A | III | 0.48 | 2.65 | 169 |
| D1 | C | III | 1.9 | 1.06 | 590 |
| D2 | C | III | 1.9 | 1.38 | 447 |
| D3 | C | III | 1.2 | 1.69 | 287 |
| D4 | C | III | 1.2 | 2.01 | 38 |
| D5 | C | III | 0.48 | 2.33 | 128 |
| D6 | C | III | 0.48 | 2.65 | 84 |
| E1 | E | I | 1.9 | 1.06 | 817 |
| E2 | E | I | 1.9 | 1.38 | 1041 |
| E3 | E | I | 1.2 | 1.69 | 1005 |
| E4 | E | I | 1.2 | 2.01 | 693 |
| E5 | E | I | 0.48 | 2.33 | 972 |
| E6 | E | I | 0.48 | 2.65 | 481 |
| F1 | B | I | 1.9 | 1.06 | 230 |
| F2 | B | I | 1.9 | 1.38 | 292 |
| F3 | B | I | 1.2 | 1.69 | 331 |
| F4 | B | I | 1.2 | 2.01 | 359 |
| F5 | B | I | 0.48 | 2.33 | 521 |
| F6 | B | I | 0.48 | 2.65 | 61 |
| G1 | A | I | 1.9 | 1.06 | 476 |
| G2 | A | I | 1.9 | 1.38 | 494 |
| G3 | A | I | 1.2 | 1.69 | 412 |
| G4 | A | I | 1.2 | 2.01 | 349 |
| G5 | A | I | 0.48 | 2.33 | 220 |
| G6 | A | I | 0.48 | 2.65 | 175 |
| H1 | C | I | 1.9 | 1.06 | 858 |
| H2 | C | I | 1.9 | 1.38 | 872 |
| H3 | C | I | 1.2 | 1.69 | 959 |
| H4 | C | I | 1.2 | 2.01 | 1191 |
| H5 | C | I | 0.48 | 2.33 | 891 |
| H6 | C | I | 0.48 | 2.65 | 806 |

Data from the analysis of some of the cell products is shown in the Table 4B, below.

TABLE 4B

Data for Comparison of Metallocene E with Comparative Metallocenes

| Run | MCN | Activator | mol % vinyls | mol % VYD | mol % Others | Mn by $^1$HNMR | % $C_{10}$ | GPC-DRI Mn | GPC-DRI Mw/Mn |
|---|---|---|---|---|---|---|---|---|---|
| A1 | E | III | 97 | 3 | 0 | 1836 | 46 | 1151 | 2 |
| A5 | E | III | 86.8 | 10.2 | 3 | 2478 | 57.1 | — | — |
| B1 | B | III | 9.3 | 61.7 | 29 | 7671 | 33.5 | 5293 | 1.9 |
| B5 | B | III | 8.8 | 63.5 | 27.7 | 7180 | 66.8 | — | — |
| C1 | A | III | 18 | 3.7 | 78.3 | 6963 | 53.3 | 5499 | 2.1 |
| C5 | A | III | 8.2 | 3.2 | 88.6 | 5791 | 71.3 | — | — |
| D1 | C | III | 0 | 63 | 37 | 5867 | 41.6 | 3597 | 2 |
| D5 | C | III | 1.7 | 68.4 | 70.1 | 4712 | 73.3 | — | — |
| E1 | E | I | 77.5 | 20 | 2.5 | 1281 | 34.6 | — | — |
| E5 | E | I | 67.9 | 28.8 | 3.3 | 2224 | 60.8 | — | — |
| F1 | B | I | 3 | 82.9 | 14.1 | 2095 | 42.2 | — | — |
| F5 | B | I | 3.3 | 72.3 | 24.4 | 2692 | 74.1 | — | — |
| G1 | A | I | 27.8 | 14.9 | 57.3 | 5705 | 33.9 | — | — |
| G5 | A | I | 9 | 9.6 | 81.4 | 5460 | 72.2 | — | — |
| H1 | C | I | 1.4 | 86.9 | 11.7 | 685 | 40 | — | — |
| H5 | C | I | 0.3 | 85.1 | 14.6 | 1241 | 70 | — | — |

KEY:
MCN = metallocene,
VYD = vinylidene

Example 5

Comparison of Activators I to III

Run time was varied, as indicated in Table 6; Activator to metallocene ratio=1:1; Reaction temperature was 85° C.; MCN=$5\times10^{-5}$ mol/L; TNOAL=$1.2\times10^{-4}$ mol/L. Total solution volume was 5 mLs.

TABLE 5A

Comparison Of Activators I to III

| Run | Metallocene (MCN) | Activator | [C$_3$], mol/L | Run Time, s | Yield, mg |
|---|---|---|---|---|---|
| A1 | E | I | 1.4 | 300.7 | 62.7 |
| A2 | E | I | 1.4 | 216.1 | 87.5 |
| A3 | E | III | 1.4 | 298.3 | 80 |
| A4 | E | III | 1.4 | 301.3 | 82.1 |
| A5 | E | II | 1.4 | 303 | 79.6 |
| A6 | E | II | 1.4 | 286.8 | 78 |
| B1 | G | I | 1.4 | 211.7 | 103.5 |
| B2 | G | I | 1.4 | 219.5 | 107.3 |
| B3 | G | III | 1.4 | 217.8 | 99.1 |
| B4 | G | III | 1.4 | 213.9 | 107.4 |
| B5 | G | II | 1.4 | 243.6 | 104.9 |
| B6 | G | II | 1.4 | 300.7 | 92.9 |
| C1 | A | I | 1.4 | 71.3 | 163.4 |
| C2 | A | I | 1.4 | 71.6 | 170 |
| C3 | A | III | 1.4 | 94.5 | 157.3 |
| C4 | A | III | 1.4 | 80.8 | 145.5 |
| C5 | A | II | 1.4 | 99.1 | 148.5 |
| C6 | A | II | 1.4 | 103.7 | 154.9 |
| D1 | G | I | 1.4 | 61.1 | 190.9 |
| D2 | G | I | 1.4 | 60.2 | 197.9 |
| D3 | G | III | 1.4 | 76.2 | 166.1 |
| D4 | G | III | 1.4 | 74.8 | 178.9 |
| D5 | G | II | 1.4 | 117.7 | 155 |
| D6 | G | II | 1.4 | 115.9 | 156 |
| E1 | E | I | 2.9 | 198 | 125.4 |
| E2 | E | I | 2.9 | 141.5 | 144.7 |
| E3 | E | III | 2.9 | 144.7 | 137.3 |
| E4 | E | III | 2.9 | 171 | 133.4 |
| E5 | E | II | 2.9 | 189.1 | 135.5 |
| E6 | E | II | 2.9 | 175.2 | 121.5 |
| F1 | G | I | 2.9 | 138.7 | 147.6 |
| F2 | G | I | 2.9 | 173.2 | 141.9 |
| F3 | G | III | 2.9 | 161.3 | 150.4 |
| F4 | G | III | 2.9 | 125.2 | 165.4 |
| F5 | G | II | 2.9 | 127.9 | 163 |
| F6 | G | II | 2.9 | 157.4 | 139.4 |
| G1 | A | I | 2.9 | 55.4 | 265.5 |
| G2 | A | I | 2.9 | 56.1 | 271.5 |
| G3 | A | III | 2.9 | 75.7 | 245.2 |
| G4 | A | III | 2.9 | 90.5 | 234 |
| G5 | A | II | 2.9 | 80.5 | 233.4 |
| G6 | A | II | 2.9 | 81.8 | 240.7 |
| H1 | G | I | 2.9 | 37 | 296.7 |
| H2 | G | I | 2.9 | 45.4 | 326.9 |
| H3 | G | III | 2.9 | 54.2 | 319.3 |
| H4 | G | III | 2.9 | 49 | 294.6 |
| H5 | G | II | 2.9 | 72.2 | 281.3 |
| H6 | G | II | 2.9 | 78.6 | 276.5 |

Data from the analysis of some of the cell products is shown in the Table 5B, below.

TABLE 5B

Data For Comparison Of Activators I to III

| Run | MCN | ACT | Yield g | mol % Vinyls | mol % VYD | Mn ($^1$HNMR) | Mn (GPC) | Mw/Mn (GPC) |
|---|---|---|---|---|---|---|---|---|
| A1 | E | I | 0.063 | 88 | 12 | 655 | — | — |
| A2 | E | I | — | — | — | — | 1137 | 2.2 |
| A3 | E | III | 0.08 | 98.6 | 1.4 | 642 | 1072 | 2.9 |
| A5 | E | II | 0.08 | 99.2 | 0.8 | 786 | 857 | 1.6 |
| B1 | G | I | 0.104 | 52.2 | 47.8 | 683 | 745 | 1.4 |
| B3 | G | III | 0.099 | 92.4 | 7.6 | 1018 | 4416 | 2.3 |
| B5 | G | II | 0.105 | 95.7 | 4.3 | 1073 | 1079 | 1.7 |
| C1 | A | I | 0.163 | 70.8 | 29.2 | 4806 | 2775 | 3.1 |
| C3 | A | III | 0.157 | 91.2 | 6.3 | 7441 | 5754 | 2.2 |
| C5 | A | II | 0.149 | 85.5 | 12.8 | 7119 | 6326 | 2.1 |
| D1 | G | I | 0.191 | 31.8 | 62.5 | 16,712 | 13,597 | 2.6 |
| D3 | G | III | 0.166 | 66.1 | 33.8 | 32,186 | 36,789 | 2.4 |
| D5 | G | II | 0.155 | 57.4 | 41.3 | 38,166 | 34,217 | 2.3 |
| G1 | A | I | 0.266 | 71.5 | 27.2 | 4424 | — | — |
| G3 | A | III | 0.245 | 91.3 | 5.9 | 7762 | — | — |
| G5 | A | II | 0.233 | 81.6 | 13.5 | 9277 | — | — |

KEY:
MCN = metallocene,
ACT = activator,
VYD = vinylidene

Examples 6 & 7

Polymerization Conditions

Anhydrous toluene was purchased from Sigma Aldrich (Chicago, Ill.) and was further dried over 4 Å molecular sieves under an inert atmosphere.

In the dry box, 10 mLs of toluene was used to dissolve a 1/1.1 equivalent ratio of metallocene/activator. The solution was stirred for 30 minutes. Five mLs of the solution was then transferred to the catalyst charger.

Higher olefin comonomer (5 g) was dissolved in 5 mLs of toluene and was charged into a syringe. Scavenger (TIBAL) (0.5 mLs of 1 M solution) was charged into a syringe.

Preparation of Reactor

The 2 L Zipper Autoclave reactor was baked at 120° C. for 1 hour under a nitrogen purge. The reactor was then cooled to room temperature under continuous nitrogen purge. Feed lines for isohexane and propylene were linked to the reactor lines, and the feed streams passed through a molecular sieve dryer (4 Å molecular sieves) prior to filling into sight glasses.

Reactor Run Procedure

The catalyst charger containing the metallocene/activator solution was attached to the reactor at an entry port. A high pressure nitrogen line was attached to the charger to discharge the catalyst into the reactor at the appropriate time.

The vent line to the reactor was closed. Using less than one pound of pressure purging out of the reactor, the higher olefin comonomer was syringed into the bottom of the reactor, using a second port. Then, using the same port, the scavenger was charged into the reactor, and the port closed. The nitrogen line to the reactor was closed. Isohexane was added to the reactor, followed by of propylene. The agitator was started at 800 rpm, and the reactor heated to the required process temperature.

Once the reactor pressure was stable at the required process temperature, the catalyst was pushed into the reactor with a nitrogen pressure 40 lbs above reactor pressure. The charger port was closed off from the reactor and the reactor software turned on to monitor pressure loss and temperature change in the reactor. The reactor was run for the desired run time. Once the software had been stopped, the reactor was cooled to RT, and the pressure vented. The solution of product and solvents was poured out of the reactor into a glass beaker and the solvents removed by nitrogen purge.

Example 6

Copolymerization of Hexene and Propylene for Viscosity Studies

Higher olefin (hexene/propylene) copolymers were made under the conditions shown in Table 7A. In the dry box, 10 mLs of toluene was used to dissolve a 1/1.1 equivalent ratio of Metallocene E/Activator III (10.7 mg/24.1 mg). TIBAL (0.5 mLs of 1 M solution) was charged into a syringe. Volume of isohexane used was 600 mL. Run conditions are shown in Table 6A, below.

TABLE 6A

Hexene/Propylene Copolymers

| Run # | $C_3$, mLs | $C_6$, mLs | Run temp, C. | Run time, min | Polymer yield, g | Activity, gP/gcat · hr | Mn by $^1$H NMR (g/mol) |
|---|---|---|---|---|---|---|---|
| 1 | 200 | 100 | 80 | 30 | 149 | 85143 | 1700 |
| 2 | 200 | 100 | 60 | 16 | 126 | 135000 | 4500 |

The viscosities of the VT-HO $C_6/C_3$ copolymers from Runs 1 and 2 were compared with VT-HO atactic $C_3$ homopolymers and are reported in Table 6B below and depicted in FIG. 1.

TABLE 6B

Comparative Viscosities of $C_3$ Homopolymers and $C_6/C_3$ Copolymers

| Polymer Type | Mn by $^1$HNMR (g/mol) | Temperature (° C.) | Torque (%) | Viscosity (cP) |
|---|---|---|---|---|
| $C_3$ Homopolymer | 1,540 | 40 | 44.2 | 5,525 |
| | | 50 | 17 | 2,125 |
| | | 60 | 7.7 | 962.5 |

TABLE 6B-continued

Comparative Viscosities of $C_3$ Homopolymers and $C_6/C_3$ Copolymers

| Polymer Type | Mn by $^1$HNMR (g/mol) | Temperature (° C.) | Torque (%) | Viscosity (cP) |
|---|---|---|---|---|
| $C_3/C_6$ Copolymer | 1,700 | 39.6 | 50.7 | 5,387 |
| | | 49.3 | 20.7 | 2,537 |
| | | 60 | 46.3 | 1,100 |
| $C_3$ Homopolymer | 6,542 | 50 | 78.5 | 392,000 |
| | | 60 | 23.6 | 117,000 |
| | | 70 | 8.4 | 42,000 |
| $C_3/C_6$ Copolymer | 4,500 | 60 | 63.6 | 31,800 |
| | | 70 | 53.6 | 13,400 |
| | | 80 | 25.8 | 6,425 |

Example 7

Copolymerization of Norbornene and Propylene

Preparation of Catalyst, Norbornene, and Scavenger

In the dry box, 10 mL of toluene was used to dissolve a 1/1.1 equivalent ratio of Metallocene G/Activator III (13.7 mg/30.9 mg) respectively. The solution was stirred for 30 minutes. Five mLs of the solution (3 mg) was then transferred to the catalyst charger. Norbornene (5 g) was dissolved in 5 mLs of toluene was charged into a syringe. TIBAL (0.5 mLs of 1 M solution) was charged into a syringe. Volume of isohexane used was 300 mLs.

TABLE 7

Norbornene/Propylene Copolymers

| Run # | $C_3$, mLs | NB, mLs | Run temp, ° C. | Run time, min | Polymer yield, g |
|---|---|---|---|---|---|
| 1 | 60 | 100 | 60 | 33 | 0.220 |

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A higher olefin copolymer having an Mn of 300 g/mol or more (measured by $^1$H NMR) comprising:

(i) from about 20 to about 99.9 mol % of at least one $C_5$ to $C_{40}$ higher olefin; and (ii) from about 0.1 to about 80 mol % of propylene;

wherein the higher olefin copolymer has at least 40% allyl chain ends.

2. The higher olefin copolymer of claim 1, wherein the copolymer has an isobutyl chain end to allyl chain end ratio of less than 0.7:1.

3. The higher olefin copolymer of claim 1, wherein the copolymer has an allyl chain end to vinylidene chain end ratio of more than 2:1.

4. The higher olefin copolymer of claim 1, wherein the $C_5$ to $C_{40}$ higher olefin is selected from pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof.

5. The higher olefin copolymer of claim 1, wherein the higher olefin copolymer has a viscosity at 60° C. of greater than 1000 cP.

6. A composition comprising the higher olefin copolymer of claim 1.

7. A higher olefin copolymer having an Mn of 300 g/mol or more (measured by $^1H$ NMR) comprising:

(i) from about 80 to about 99.9 mol % of at least one $C_4$ olefin;

(ii) from about 0.1 to about 20 mol % of propylene; and wherein the higher olefin copolymer has at least 40% allyl chain ends.

8. The higher olefin copolymer of claim 7, wherein the copolymer has an isobutyl chain end to allyl chain end ratio of less than 0.7:1.

9. The higher olefin copolymer of claim 7, wherein the copolymer has an allyl chain end to vinylidene chain end ratio of more than 2:1.

10. The higher olefin copolymer of claim 7, wherein the higher olefin copolymer comprises at least 50 wt %, based upon the weight of the copolymer composition, of olefins having at least 36 carbon atoms, as measured by $^1H$ NMR, assuming one unsaturation per chain.

11. A composition comprising the higher olefin copolymer of claim 7.

* * * * *